US008175732B2

(12) United States Patent
Dam et al.

(10) Patent No.: US 8,175,732 B2
(45) Date of Patent: May 8, 2012

(54) MANUFACTURING SYSTEM AND METHOD

(75) Inventors: Tam Dam, Petaluma, CA (US); Kesavan Srikumar, Cupertino, CA (US)

(73) Assignee: Harris Stratex Networks Operating Corporation, Morrisville, NC (US)

(*) Notice: Subject to any disclaimer, the term of this patent is extended or adjusted under 35 U.S.C. 154(b) by 109 days.

(21) Appl. No.: 11/615,880

(22) Filed: Dec. 22, 2006

(65) Prior Publication Data

US 2008/0154909 A1      Jun. 26, 2008

(51) Int. Cl.
*G06F 19/00* (2006.01)
(52) U.S. Cl. .............................. 700/95; 700/96; 700/108
(58) Field of Classification Search .................... 700/95, 700/108–110, 96, 100; 702/81, 84, 182, 702/183, 185, 188; 705/7, 8, 9, 26–28; 707/10, 707/100, 104.1; 709/201, 203, 217, 219
See application file for complete search history.

(56) References Cited

U.S. PATENT DOCUMENTS

| | | | |
|---|---|---|---|
| 6,295,513 B1* | 9/2001 | Thackston ................. 707/104.1 |
| 6,546,300 B1* | 4/2003 | Fukuda et al. .................. 700/97 |
| 6,618,692 B2* | 9/2003 | Takahashi et al. ............ 702/188 |
| 6,647,304 B2* | 11/2003 | Tsukishima et al. ............ 700/95 |
| 6,725,122 B2* | 4/2004 | Mori et al. ..................... 700/121 |
| 6,816,861 B2* | 11/2004 | Ikeda et al. ..................... 700/96 |
| 6,873,999 B2* | 3/2005 | Hirayama ...................... 700/110 |
| 6,928,396 B2* | 8/2005 | Thackston ................. 707/104.1 |
| 7,069,230 B2* | 6/2006 | Krystek et al. .................... 705/9 |
| 7,346,588 B2* | 3/2008 | Shimizu et al. .................. 700/96 |
| 7,356,558 B2* | 4/2008 | Luce et al. ..................... 709/201 |
| 7,426,478 B2* | 9/2008 | Grosvenor et al. ............... 705/7 |
| 7,505,927 B2* | 3/2009 | Price ............................... 705/26 |
| 2002/0035447 A1* | 3/2002 | Takahashi et al. ............ 702/188 |
| 2002/0052862 A1* | 5/2002 | Scott et al. ........................ 707/1 |
| 2002/0091536 A1* | 7/2002 | Seaman et al. ..................... 705/1 |
| 2002/0147622 A1* | 10/2002 | Drolet et al. ...................... 705/7 |
| 2002/0165805 A1* | 11/2002 | Varga et al. ..................... 705/28 |
| 2003/0125972 A1* | 7/2003 | Luce et al. ........................ 705/1 |
| 2003/0200130 A1* | 10/2003 | Kall et al. ..................... 700/100 |
| 2004/0138839 A1 | 7/2004 | Tsuji |
| 2004/0214097 A1 | 10/2004 | Suttile et al. |
| 2004/0267557 A1 | 12/2004 | Liu et al. |
| 2005/0256598 A1 | 11/2005 | Mata et al. |
| 2006/0200261 A1 | 9/2006 | Monette et al. |

FOREIGN PATENT DOCUMENTS

TW              426904           3/2001
WO     WO 2004/014274 A2      2/2004
(Continued)

*Primary Examiner* — Charles Kasenge
(74) *Attorney, Agent, or Firm* — Sheppard, Mullin, Richter & Hampton LLP

(57) ABSTRACT

One aspect related to design of systems and methods for product manufacturing is portability, i.e., allowing for manufacture at multiple locations independent of the skill set of the contract manufacturer. Another aspect includes making data needed and generated during the manufacturing process readily accessible to various elements of the system infrastructure. The present invention contemplates design of manufacturing systems for products that incorporate technology in skilled areas. A preferred approach includes design of the product itself, data exchange between infrastructure elements, and making data accessible also for post-manufacturing functions. This includes storing manufacturing related data in a server and making such data substantially instantly accessible once the data is written in the server. Such data preferably includes software to configure production stations in a production portion of the system. A system design using this approach is particularly useful in the manufacture of a microwave radio.

46 Claims, 8 Drawing Sheets

FOREIGN PATENT DOCUMENTS

| WO | WO 2004/014274 A3 | 2/2004 |
| WO | WO 2005/008349 A1 | 1/2005 |
| WO | WO 2005/017790 A1 | 2/2005 |
| WO | PCT/US07/087640 | 7/2008 |

* cited by examiner

MANUFACTURING SYSTEM AND METHOD

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This invention is generally related to manufacturing and, more specifically, to systems and methods for manufacturing products that include technology in a skilled area, such as microwave radios.

BACKGROUND

Manufacturing of products includes design not only of a product but also of the manufacturing system itself. Design of the manufacturing system includes design of the infrastructure and element thereof, such as production stations and data repositories. The design should also consider a manufacturing process including a process flow between production stations at a manufacturing plant. In addition, consideration should be given to a configuration of the production station itself, including what functions the station is to perform.

A company may wish to manufacture a product at one or more remote manufacturing plants, for example, at one or more CMs (contract manufacturers). Manufacturing systems and infrastructure for generating, collecting and storing data, for configuring the production stations, and for managing different configurations of the product should ideally be compatible between the company and the CMs.

A company may be an entity for which the products are being manufactured, and it may be the entity that drives demand for products to be manufactured by a CM and that pays the CM for such manufactured products. A company may be the entity owning the product design. Such company may also be the entity for which a particular product is being manufactured under OEM (original equipment manufacturer) branding. A company may perform its own manufacturing, for example, at its own manufacturing plant. In such a case, there is no third party CM, and the company and the CM may essentially be one and the same entity. In other situations, the company and the CM may be different entities but belong to the same parent entity. For example, the company may be a U.S.-based subsidiary and the CM a China-based subsidiary of the same parent entity. In such a situation, whether the company and the CM are treated as two different entities or as a single entity may depend on how demand is driven, payments are made, and confidential and proprietary information is shared between the two subsidiaries. A company and a CM are typically, but not necessarily, separate from suppliers of components and subassemblies to be incorporated into manufactured products and from suppliers of the equipment used in the manufacturing process. This may also apply to customers, i.e., entities purchasing the manufactured product from the company.

In order to manufacture a product, various types of data and software typically needs to be transferred to the manufacturing plant. Such data related to the product itself includes, for example, a BOM (bill of materials) and may further include software in one or more revisions to be installed on the product to be manufactured. Multiple revisions of software may be needed if the product is configurable via software. In addition, data and software may need to be transferred to the manufacturing plant in order to configure the tasks performed on the production station. Such data may include instructions and specifications to be used by an operator of the production station. Instructions may be provided, for example, in the form of a manual for training purposes and thereafter as a reference, as a flow chart, check list or the like to be posted at or near the production station for the operator to refer to during processing at the production station, or the like. Instructions may be transferred in hardcopy format and mailed to the manufacturing plant. Instructions may alternatively be transferred in electronic format (e.g., on a CD-ROM, via email) for installation on the production station to be displayed to the operator during processing, to be printed at the manufacturing plant (e.g., manuals for reference), or a combination thereof. Specifications may include information related to the product to be manufactured, to the operation of the production station, to the configuration of the product and/or the production station, and the like. For example, specifications may include a table, list or other description of what software revision is to be installed depending on the part number, customer, branding, and so forth of the product being manufactured. Specifications may also include a table, list, or other description of what software, instructions, and specifications are to be installed on or otherwise used at the production station depending on the part number, customer, branding, and so forth of the product being manufactured. Specifications, like instructions, may be transferred to the production plant in hardcopy or electronic format. Software is transferred in electronic format. In some instances, new revisions of software for configuration of the production station is provided as part of a visit to the manufacturing plant by an engineer from the company responsible for its installation on such production stations and possibly also for training of die operators during the visit.

As noted, transfer of data and software to the manufacturing plant frequently includes multiple types media (e.g., hardcopy, electronic format). In addition, the transfer may involve different time frames. Data and software provided via email for example, arrives at the manufacturing plant faster than data and software provided via regular mail or withheld until the next visit by an engineer from the company. Although new or updated data and software may have arrived at the manufacturing plant, it may not be put into effect immediately upon receipt, or some production stations or parts of the process flow may be updated at one time and other stations and parts of the process flow at a later time. Such time differences, in arrival of data and software, their being put into effect, or both, may result in production stations in a manufacturing line being differently configured, causing line stops, delays, and the like.

After the product has been manufactured, various types of manufacturing data associated with the product may be needed at the company and thus need to be transferred from the manufacturing plant. Post-production use of manufacturing data may include customer service and repair. Depending on the manner and extent of collection of manufacturing data daring the manufacturing process, some or all such data needed for the post-production use may not be available at all, in various formats such as a combination of paper and electronic format, stored to various locations such as a traveler card, local production stations, and a manufacturing database, and the like. This may cause difficulties and delays in transferring manufacturing data from the manufacturing plant back to the company and may make it difficult to analyze manufacturing data to, for example, measure the effectiveness of the manufacturing process or to improve manufacturing yield.

Some products include technology in particularly skilled areas. Examples of skilled areas of technology include radio frequency and microwave technologies in products such as microwave radios, medical devices such as X-ray, CAT (computed axial tomography) or MRI (magnetic resonance imaging) machines, or fiber optics systems. Such products often include one or more subassemblies capable of configuration. Errors in the manufacture of a product may result, after shipping, in unacceptable performance, liability for failing to conform to regulations or standards, or other anticipated or unanticipated problems. In some skilled areas of technology, such as those involved in medical devices, errors may cause physical harm.

Therefore, there is a need to consider the foregoing in the design of manufacturing systems and methods and the benefit of a system infrastructure capable of being ported to multiple manufacturing plants, including plants lacking personnel with a skill set in a particular technology. One desired aspect of such design might be to substantially increase accessibility of data and software used at various production stages.

SUMMARY

The present invention addresses these and related aspects of design of manufacturing systems and methods. In particular, the present invention contemplates design of systems for manufacture of products incorporating technology in skilled areas. A preferred approach includes designing a flexible and scalable system infrastructure portable to multiple manufacturing plants. This system infrastructure generally includes an engineering development portion, a central portion, and a production portion. The production portion is typically disposed at the manufacturing plant, such as the company's own manufacturing plant or that of a CM (contract manufacturer). The engineering development portion is typically disposed at company headquarters. Infrastructure elements included in the central portion may be disposed at the company, the manufacturing plant, or a combination thereof.

The production portion typically includes multiple production stations configured to perform one or more station production functions, such as incoming inspection, assembly, and testing. The central portion includes data repositories, such as servers, databases, and the like. The engineering development portion includes infrastructure elements used to develop software, instructions, and specifications to configure production stations such that the production stations can be operated by a person who is unskilled in the area of technology. The engineering development portion further includes elements used to manage and troubleshoot the infrastructure as a whole. Infrastructure elements for generating reports may be found in all three portions of the infrastructure.

A production line typically includes multiple production stations with each station designated, for instance, to one or more of assembly, testing, calibration, and branding. Many products to be manufactured include multiple subassemblies, one or more of which are capable of being configured in multiple ways. Ideally, the processing performed at the production station includes verifying that the processing at production stations at prior stages is the process flow is complete. Moreover, such processing should ideally include verifying the accuracy of data associated with the subassembly being processed to avoid errors.

Such verification requires access to data associated with the BOM (bill of materials) of the product to be manufactured, data from production stages prior to the subassembly's arrival at the particular production station, desired and actual configuration revisions, and so forth. If the verification is not successful, the subassembly should not be accepted for further processing at the particular production station. Processing may also include generating data, such as test data, for use at later production stages or for post-production purposes, such as customer service and repair. Such data should ideally be readily available for such post-production purposes.

The preferred approach includes storing in a server in the central portion data associated with the product being manufactured, including data of units (e.g., components, subassemblies) thereof. This includes making such data substantially instantly accessible to production stations in the system. This also includes, prior to processing on the unit at a typical production station, retrieving data from a unit, comparing such data with server data associated with the product, and verifying that the unit is a correct unit. The preferred approach further includes verifying that processing of the unit at all preceding stages is complete. This helps prevent further processing if an incorrect unit, such as an incorrect part number or configuration, is detected.

The preferred approach ideally further includes the ability to control a production station at the manufacturing plant from company headquarters, to store software to be used on the production station in the server, and to remotely cause such software to be downloaded and installed on the production station. A system and method design using this approach is useful, for example, in the manufacture of an outdoor unit of a split-mount microwave radio system.

This system design provides a number of possible advantages. Among them is the ability to configure, from a remote location, the tasks the production station is to perform and how it performs them. The configuration includes remotely developing software for use on the production station and making such software available for download, or causing such software to be downloaded, to the production station. Storing data retrieved, generated, and updated from the production stations in the server increases the accessibility of data and software needed for manufacturing and substantially reduces the likelihood of errors. The system design allows for traceability of data associated with units incorporated into manufactured products. The system design thus achieved is portable to and capable of being duplicated at any CM with low requirements for maintenance and training of new operators.

Accordingly, for the purpose of the invention as shown and broadly described herein, the present invention is directed to a system and method for manufacturing products incorporating technology in skilled areas. In accordance with one embodiment, a manufacturing system for processing manufactured products with one or more units that incorporate technology in a skilled area comprise: a server, a production portion, and an engineering portion. The server is operative to store manufacturing data including data associated with a product comprising at least one unit incorporating technology in a skilled area. The production portion is communicatively coupled with the server. The production portion comprises a production station operative to perform a station production function for processing the at least one unit based on the manufacturing data. The engineering development portion is also communicatively coupled with the server as well as, via the server, with the production portion. The engineering development portion comprises a central production station operative to perform a central production function. In such manufacturing system, the manufacturing data, once written in the server, is substantially instantly accessible to the production and engineering development portions.

Such manufacturing system may also include a production switch, a central switch, or both. The engineering development portion may also include a test specification/software station which is communicatively coupled with the server and is operative for development of software, instructions, and specifications. Such software, instructions, and specifications, may be adapted to configure the production station to perform one or more station production functions. The production station may be adapted to be operated by a person who is unskilled in the area of technology. The central production function may include one or more of station production functions, managing production station activities, and managing testing of production software, instructions, and specifications. The station production function may include incoming inspection, assembly, testing, branding, final quality assurance, calibration, or any combination thereof. The station production function and the central production function may each be performed manually, automatically, in an automated fashion, or in any combination thereof. To that end, the central production station, the production station, or both, may include a PC, a computerized system, a device or mechanism to hold manufacturing data obtained together with the unit, and a device for adding or modifying manufacturing data.

The central production station may also be communicatively coupled to the test specification/software station and operative to test the software, specifications, and instructions developed on the test specification/software station and to write die developed and tested software, specifications, and instructions in the server so that they become substantially instantly accessible to the production and engineering portions once written in the server. The test specification/software station, the central production station, or both may also be operative to remotely cause the software, specifications, and instructions to be downloaded to the production station. Alternatively or additionally, the production station may initiate such download. The server may include a production lifecycle management (PLM) server. It may be disposed at a manufacturing plant or at a company location. The server may include a main and a redundant server, or a central server and a CM server. The data stored on the central, server may include portions of the data stored on the CM server, and vice versa. The system may include a PLM server in addition to the server, and a personal computer (PC) communicatively coupled with this PLM server, which in turn may comprise an enterprise resource planning (ERP) server, an Agile server, a licensing information access (LIA) server, or a combination thereof. In such embodiments of the system, one or more PCs may be communicatively coupled to the individual servers, for example, a PC licensing station coupled to the LIA server.

The server may store read-only data, read-and-write data, or both. In addition, some or part of such data may be restricted access data. Company management may access the server locally, when the server is disposed at the company location, to obtain data stored in the server and to write data in the server. Management may also generate central reports, which may include data related to one or more of sales, customers, pricing, sales commissions, costed BOMs, and data to which access is restricted to company management personnel and not accessible to personnel at the manufacturing plant. The unit may be an intermediate frequency subassembly, a radio frequency local oscillator subassembly, a transceiver subassembly, a power module subassembly, a diplexer subassembly, or a mechanical subassembly. The product may be an outdoor unit of a split-mount microwave radio system.

The manufacturing system may further include a report generating software server communicatively coupled with the server and operative to store report generating software. The system may farther include a report generating station, for example, a central or a production report generating station, or both, operative to generate, respectively, a central report and a production report.

The system may also include a staging/manufacturing data access (MDA) server communicatively coupled with a daily/weekly MDA download station as well as with an MDA station. Such elements may be operative to store, provide, and/or download manufacturing data. In some embodiments, the staging/MDA server may comprise separate staging and MDA servers.

The communicatively couplings with the server may include, for example, a local area network, a wide area network, an optical fiber, a microwave link, Ethernet, Internet, Wi-Fi, a private line, or a leased line. The system may further include a private line, which may comprise a main and a redundant private line.

In further accordance with the purpose of the invention as embodied and broadly described herein, a method for processing manufactured products with one or more units that incorporate technology in a skilled area comprises the steps of: storing manufacturing data in a server, writing in the server supplier data associated with a unit incorporating technology in a skilled area, and providing the manufacturing data to production and engineering development portions. Such manufacturing data may include the supplier data and be substantially instantly accessible to the production and engineering development portions once written in the server.

Such method may further include writing in the server manufacturing data from the production or the engineering development portion, wherein the written manufacturing data includes data retrieved from the unit, new or updated data generated during performance of a station production function, of a central production function, or a combination thereof. The station production function may include incoming inspection, assembly, testing, branding, final quality assurance, calibration, or a combination thereof. Such method may further include writing manufacturing data to the unit, for example, manufacturing data stored in the server, the supplier data, and/or new and updated generated data. The supplier data may be obtained from a supplier having skills in the area of technology and may be obtained in electronic format, such as on a CD-ROM. The unit may include a transceiver, power supply diplexer, or mechanical subassembly.

The method may further include performing analysis on the manufacturing data and generating a report based on the performed analysis. This may include statistical analysis and the generated report may include, for example, a statistical process control chart, a Cpk chart, or a three-sigma chart.

In another embodiment, the method may include: storing software, specifications, and instructions in a server and providing such software, specifications, and instructions for download to the production station. The storing may be from an engineering development portion. The software, specifications, and instructions may be configured to perform a production function, to allow a person who is unskilled in the area of technology to operate the production station once the software, instructions, and specifications have been installed on the production station. The software, specifications, and instructions may also be substantially instantly accessible to the production station once written in the server. In such method, the download may be initiated remotely or from the production portion.

In yet another embodiment, the method may include: storing manufacturing data to a daily/weekly MDA download station, providing the stored manufacturing data for download to a staging/MDA server, downloading such data to the staging/MDA server, and providing the downloaded data to an MDA station. The staging/MDA server may be communicatively coupled with the MDA station as well as with the daily/weekly MDA station. Such download may be initiated remotely or at the daily/weekly MDA download station.

These and other features, aspects and advantages of the present invention will become better understood from the description herein, appended claims, and accompanying drawings as hereafter described.

BRIEF DESCRIPTION OF THE DRAWINGS

The accompanying drawings, which are incorporated in and constitute a part of this specification, illustrate various aspects of the invention and, together with the description, serve to explain its principles. Wherever convenient, the same reference numbers will be used throughout the drawings to refer to the same or like elements.

DETAILED DESCRIPTION

Figure 1:
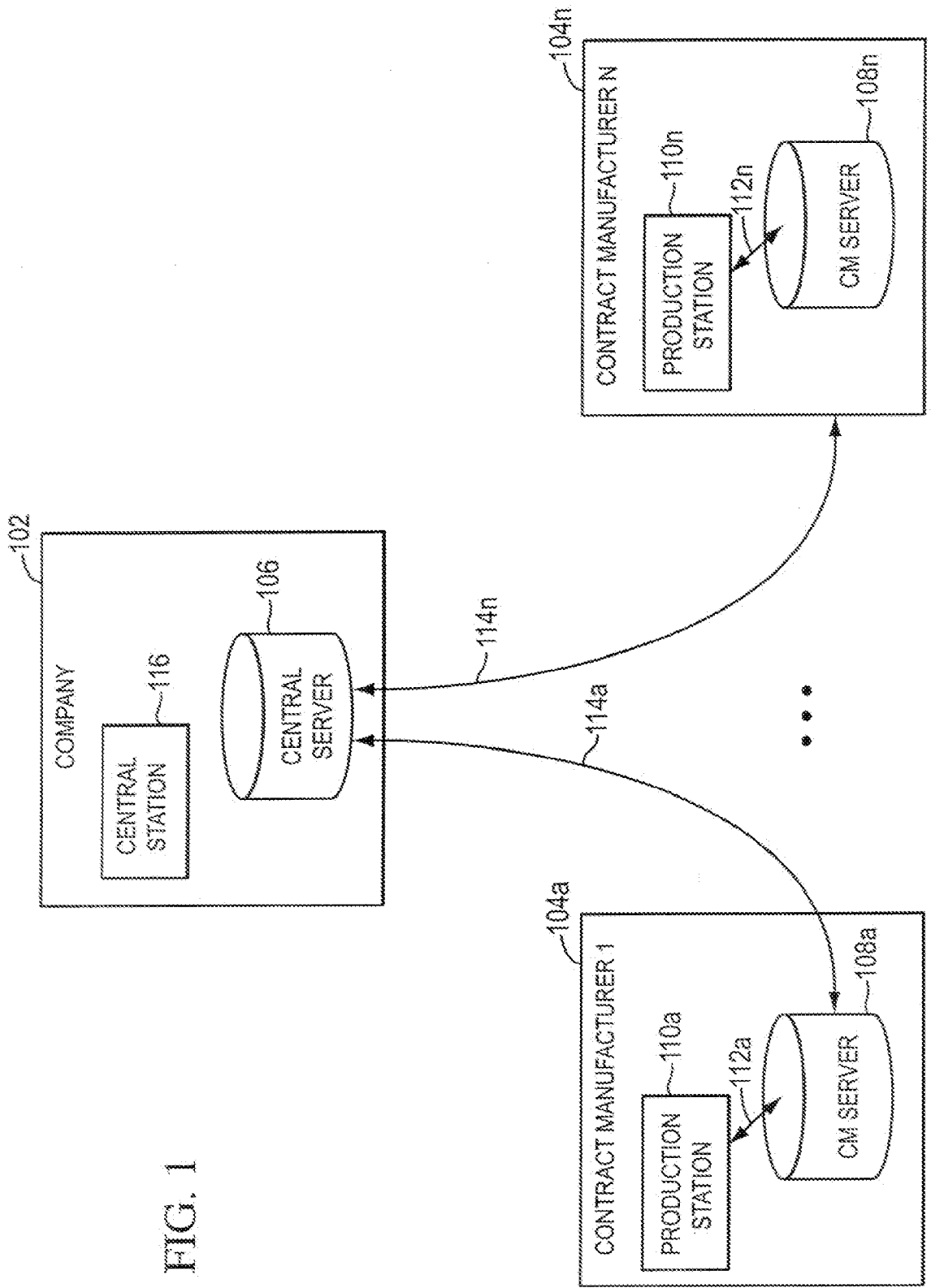
FIG. 1 is a block diagram of a manufacturing system for products incorporating technology in skilled areas according to one embodiment of the invention.

As mentioned, the present invention contemplates an approach for designing a manufacturing system for manufacturing products comprising multiple units. The design includes a production portion, a central portion, and an engineering development portion.

The production portion of the system includes stations, PCs (personal computers) and infrastructure elements located at the manufacturing plant. The central portion includes infrastructure elements shared between the manufacturing plant and a company location. Such shared elements typically include one or more servers operative to store data associated with the product being manufactured, with the manufacturing processes, or both. The engineering development portion includes stations and infrastructure elements located at the company. Such engineering development stations may include functionality allowing them to control a production station.

Functions of the system as a whole may generally be divided into two categories, namely control over the product being manufacturing, and control over the configuration of the station itself. Functions related to control over the product include verifying data associated with a unit and with the product being manufactured prior to processing the unit at a production station. Upon receipt of a unit, the production station obtains information from a server. Examples include a BOM (bill of materials) for the product being manufactured, and the part number and configuration of desired units according to the BOM. If the unit is a correct unit for the product, the station also verifies that processing at prior stages in the process flow is complete. If the verification is successful, processing proceeds. If not, the production station typically displays an error message to ah operator and prevents further processing of the unit.

During processing of the unit, the production station collects data. The station may write collected data in the server, to memory in one or more of the units incorporated into the product, or both. Collected data may include a calibration file to be used at a later stage in the process flow.

The second category of functions includes control over the configuration of the station itself. The station may include multiple functions, for instance, assembly and testing, or calibration and thermal testing. Even if the station performs substantially only one function (e.g., assembly), its configuration may depend on the tasks to be performed. For example, a station may be configured to process microwave radio systems one week and medical devices the following week. The company may also wish to alter the functions of the station, for example, by adding, deleting, or modifying a step. To that end, the station may download and install from the server revised software, specifications, and instructions to be used on the station itself. Alternatively, download and installation may be initiated from a remote company location.

A preferred approach to designing a system for manufacturing products therefore includes controlling the manufacturing process and preventing processing if an error is detected. The approach allows for controlling stations from the company location, for example, for troubleshooting purposes. The approach will preferably achieve the goal of substantially increasing accessibility of data by storing data in a server and making the design portable to multiple manufacturing plants. A design using this approach is particularly useful in the manufacture of an outdoor unit of a split-mount microwave radio system.

This design approach has taken into consideration the beneficial aspects as well as deficiencies of various manufacturing system designs. One such design may include manually collecting, on paper, data associated with the unit. For example, data collected manually may be logged on a traveler card that follows the unit on the production line, with the card being stamped at each production station and capable of being annotated by the operator. The card is typically archived and may be retrieved to review the data at a later time. Other data may be collected electronically, for example, on a local computer (e.g., coupled to a stand-alone production station), or in one or more databases on a computer system.

Another such design may include developing, at company headquarters, new revisions of software, specifications, and instructions to be used on the production station. Once released, such new revisions may be transferred, for example, to a remote manufacturing plant (e.g., a contract manufacturer's plant) via mail (e.g., on CD-ROM), e-mail, FTP (file transfer protocol), or the like.

As a further alternative, such design may include manual verification that the proper part number, configuration, branding, and so forth are used during the task to be performed at the production station (e.g., assembly, calibration, post functional testing). A human error in the verification may not necessarily lead to the manufactured product's failing subsequent tests, depending on which incorrect part or undesirable configuration was actually used. A product thus manufactured, even if it passes production tests, may nonetheless fail in the field.

Moreover, in same design approaches, a customer's order may be filled by first manufacturing all products in a single (e.g., predefined) configuration. All or a subset of such products may then be reconfigured to conform to, for example, a downgrade in the software revision with such products being later used as spares or replacements for the customer's existing installation of products. Another subset may be reconfigured to private labeling. The foregoing approaches each addresses one or more aspects of data collection, assembly, testing, verification, and so forth but not necessarily simultaneously in the same manufacturing system or based on a system design that lends itself to manufacturing products incorporating technology in skilled areas without the need of specialized technical capabilities at the manufacturing plant.

Thus, a preferred approach generally includes electronic collection and storage, in a server, of substantially all information, including manufacturing data, software, instructions, and specifications used, generated, and updated and making such information accessible to multiple stations in the manufacturing plant as well as, preferably, to the company headquarters. The preferred approach further includes elements of the manufacturing system, such as routers, adapted to achieve a flexible and scalable infrastructure that is portable and reproducible at multiple manufacturing plants.

To illustrate various aspects of the present invention, FIG. 1 illustrates a block diagram of a manufacturing system for products incorporating technology in skilled areas according to one embodiment of the invention. This may be a distributed manufacturing system. Such a system is characterized by system elements being distributed between multiple locations, operated by multiple entities, or both. The portion of the system at each CM (contract manufacturer) comprises a production station 110a-n operatively coupled with a CM server 108a-n via a communications link 112a-n. In addition, each CM server 108a-n is operatively coupled with a central server 106 via a communications link 114a-n. The CM servers 108a-n are typically not operatively coupled with each other. For instance, CM servers 108a and 108n may be owned and operated by two distinct entities, such as two competing CMs. In such an embodiment, the CM servers 108a and 108n are typically not coupled so as to protect each CM's proprietary and confidential information which may be stored in the servers. However, one CM may operate two or more manufacturing plants. In such an embodiment, CM servers 108a and 108n may be owned by that one CM, and the two CM servers 108a and 108n may be communicatively coupled with each other (not shown).

The servers 106, 108 are adapted to store data. Examples of stored data include manufacturing data, test data such as actual measured value of all tested parameters for each test run, software for use on the production station 110, BOMs, configuration versions, product options, dates of manufacture, calibration files, costs, supplier provided data associated with purchased units, pricing, customer data, and the like.

A server typically functions as a data repository and data service system. Such system therefore may include a server, a database, a data storage, a data retrieval device, or a combination thereof. The server 106, 108 may comprise one or more servers. For example, the server 106 may comprise a PLM (product lifecycle management) server, which in turn may include an ERP (enterprise resource planning) server, a CRM (customer relationship management) server, an SCM (supply chain management) server, and the like. Examples of such servers include server hardware and software promoted by companies such as Agile Software Corporation, Oracle Corporation, SAP AG, SAP America, Inc., Autodesk, Inc., and others.

The production station 110 is adapted to download data from the CM server 108, to store data, and to store, download, install and execute software, instructions, and specifications. The software, instructions, and specifications determine the nature and scope of tasks to be performed at the production station 110 and typically differ between a production station 110 configured as, for example, an assembly station and a production station 110 configured as a thermal testing station. The production station 110 is further adapted to access the data stored in the server 108, to collect data obtained during the process steps performed on the production station 110, to generate data, and to write part or all of the collected data and the generated data in the server 108 via the communications link 112. Writing in the server 108 may include transferring and storing. The collected data may include data retrieved from a unit being processed at the production station. The generated data may include data created or updated during processing of the unit. Examples of generated data may include test data, assembly data, and calibration data, depending on the nature of the process performed on the production station 110.

The production station 110 may be automated, i.e., require input or supervision by a human being (e.g., a production line operator). In some embodiments, the production station 110 may be automatic, i.e. require no input or supervision by the operator. As a further alternative, one or more tasks performed may be performed manually, for example, retrieving and storing data on the traveler card. In embodiments In which the production station 110 performs at least part of the station production function automatically or in an automated fashion, the production station 110 may be a PC or other computerized system. A computerized system may include hardware such as a CPU (central processing unit), memory such as a hard drive, ROM (read only memory), RAM (random access memory), a floppy disk, a magnetic tape, an optical disk, a CD-ROM or the like, and software to run on the CPU and which may be stored on the memory. The computerized system may further include input and/or output devices. Examples of input devices include a keyboard, a key pad, a pointing device such as a mouse, a voice recognition system, a scanner, and a bar code reader. Examples of output devices include a monitor, an LCD (liquid crystal display), a printer, a label maker, and a bar code output device (e.g., a device generating and/or printing a bar code, for example, on a label). In embodiments in which the production station 110 performs the station production function manually, or partly manually, the production station 110 may include a device or mechanism to hold (e.g., store, view) manufacturing data obtained together with the unit to be processed. Such manufacturing data may be obtained, for example, on a traveler card attached to or otherwise associated with the unit. The production station 110 may further include a device for adding or modifying manufacturing data. Such a device may be include a pen, a mechanism for increasing the space on which to add manufacturing data (e.g., a mechanism for adding another sheet to the traveler card or for otherwise attaching a separate sheet to the traveler card), a writing pad, a clip board, and the like.

The production station 110 may further include one or more of test probes, a reader (e.g., a bar code reader), a scanner, a voltmeter, an ohmmeter, a galvanometer, a power supply, a signal generator, a pulse generator, an oscilloscope, a frequency counter, a logic analyzer, a spectrum analyzer, a frequency synthesizer, a function generator, a network analyzer, a test light, a continuity tester, a cable tester, a data logger, a fixture, an emulator, a simulator, a test harness (e.g., a collection of software and test data configured to test software by running it under varying conditions and monitor its behavior and outputs), a boundary scan testing device, an in-circuit testing device, an intermediate frequency testing device, or a radio frequency testing device. The production station may include any combination of the foregoing and it may include further assembly and/or test and calibration tools.

Various embodiments include production stations performing multiple tasks. In such embodiments, software, instructions, and specifications associated with multiple station production functions may be installed on the same PC or computerized system. For example, a manufacturing system may be a combined calibration and thermal testing station.

The communications link 112 may include a LAN (local area network), a WAN (wide area network), an optical fiber, a microwave link, Ethernet, the Internet, Wi-Fi, a private line, a leased line, or the like. In some embodiments, the communications link 112 may include a firewall, a VPN (virtual private network), or the like adapted to restrict access to select users (e.g., on an individual basis or on a basis of job function). The skilled area of technology may include microwave technology, and the product being manufactured may include an outdoor unit of a split-mount microwave radio system.

Communications links 114a-n are substantially similar to communications links 108a-108n. A LAN may be preferred in embodiments in which the CM 104a is located in close proximity to the company 102. Examples include a building complex in which the CM and the company are co-located. A leased line of a private line may be preferred in embodiments in which the CM 104b is a non-U.S. facility, for example, used by company 102 for volume production.

The central station 116 may be a station configured substantially similarly to one or more of the production stations 110a-n. For example, the central station 116 may be configured to emulate the functionality performed at the production station 110a. Central station 116 may, alternatively or additionally, comprise a station for report generation, development and testing of software, specifications, and instructions, and the like. Possible embodiments of the central station 116 are described in further detail in connection with FIGS. 2A-2C, 3 and 4.

Some systems may include only one manufacturing plant, such as CM 104a. The portions of the system at CM 104a may be operated by an entity other than the company 102. Such entity may include a company, a corporation, or the like (e.g., a non-U.S. entity). In some systems, the company 102 may operate the portions of the system located at CM 104a. For example, the company 102 may operate its own manufacturing plant located at a facility remote from its development engineering and management facility.

Figure 2A:
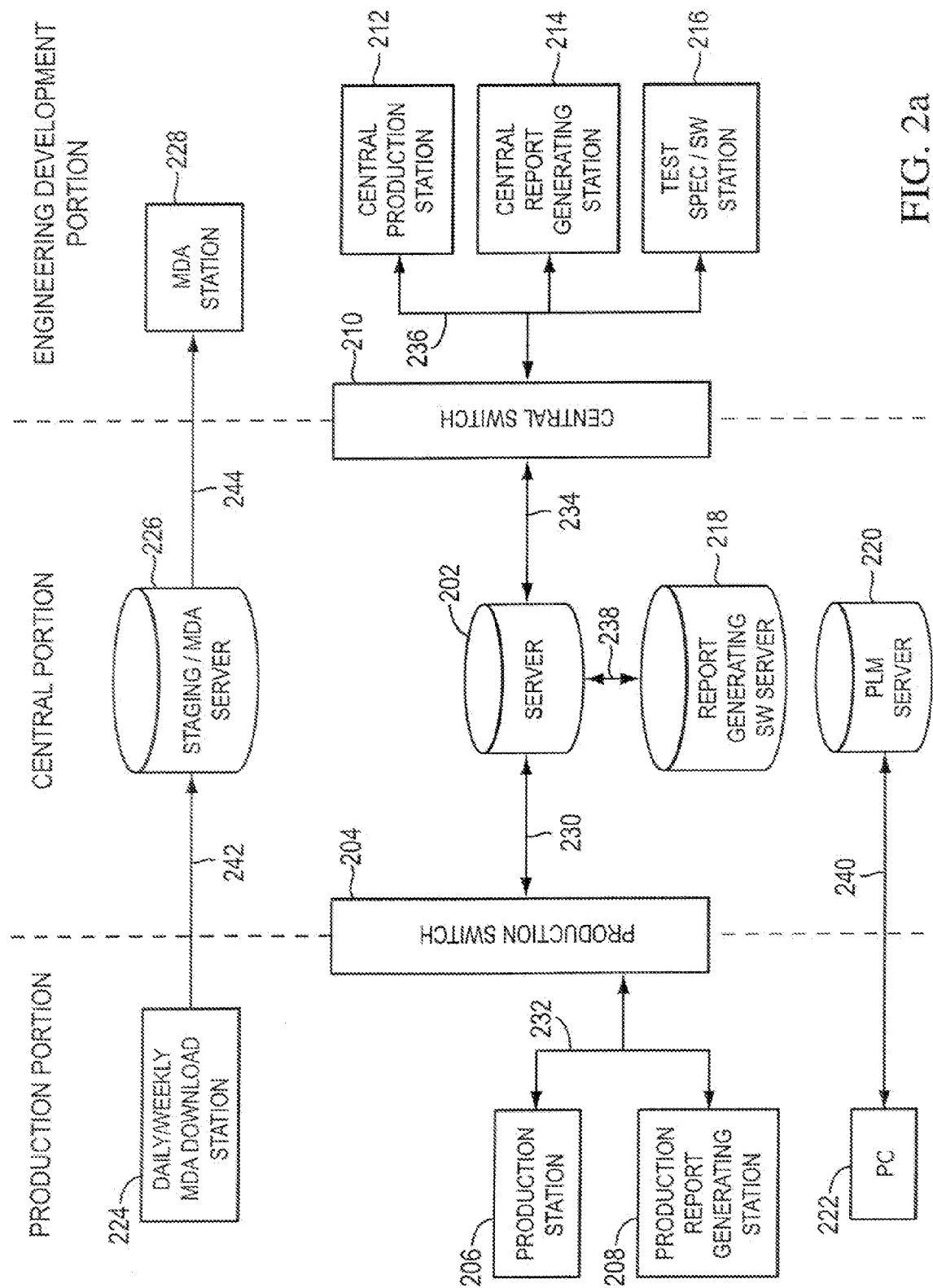
FIG. 2A is a block diagram of a manufacturing system with a local manufacturing plant according to one embodiment of the invention.

FIG. 2A illustrates a block diagram of a manufacturing system with a local manufacturing plant according to one embodiment of the invention. The manufacturing system comprises multiple elements. Some elements may be optional. Conceptually, the system may be divided into three portions, namely a production portion located at the manufacturing plant, an engineering development portion typically located at the company headquarters, and a central portion comprising infrastructure elements shared by (e.g., accessible to and used by) the production and engineering development portions. Elements used by management are typically included in the central or engineering development portion of the system. Such elements may include accounting and payroll functions.

Elements included in the production portion of FIG. 2A typically correspond to elements disposed at the CM 104 of FIG. 1. The system illustrated in FIG. 2A may comprise multiple production portions, one each for CMs 104a-n. The engineering development portion of FIG. 2A is typically disposed at the company 102 of FIG. 1. The elements included in the central portion may be disposed at the company 102, at one or more of the CMs 104a-n, or a combination thereof, as is further described below and illustrated in FIGS. 2A-C, 3, and 4.

The central portion includes a server 202 operatively coupled with a central switch 210 via a communications link 234 and further operatively coupled with a production switch 204 via a communications link 230. The server 202 is adapted to store data and to provide substantially instant access to such data to those elements of the manufacturing system communicatively coupled with the server 202. The server 202 may comprise the central server 106, the CM server 108a-n, or a combination of both as described in connection with FIG. 1. The central switch 210 and the production switch 204 may include a router or other network connection. The production switch 204 is adapted to interconnect elements at the production portion with elements at the central portion of the system. Likewise, the central switch 210 is adapted to interconnect elements at the engineering development portion with elements at the central portion of the system.

In addition to the server 202, the elements in the central portion may include a report generating software server 218 operatively coupled with the server 202 via communications link 238. The report generating software server 218 is adapted to store software used to generate reports. The reports may be generated at a station at the production or engineering development portion of the manufacturing system, as further described below.

The production portion may include a production station 206 and a production report generating station 208 each operatively coupled with the production switch 204 via a communications link 232. The production station 204 may comprise the production station 110. The production report generating station 208 is adapted to access the report generating software stored in the report generating software server 218, to execute such software, to obtain data from the server 202, and to generate a report based on the obtained data. The report generating software may include functionality to perform analysis. An example is statistical analysis. The generated report may include a statistical chart, such as a chart depicting a process capability index such as Cpk, or a three-sigma chart. The generated report may further be a report associated with QA (quality assurance) data, such as data associated with RMA (return materials authorization) or MTBF (mean time between failure) data, manufacturing cycle time, or manufacturing yield. As a further example, the generated report may comprise a genealogy tracking report, which, for example, may trace manufacturing data down to critical subassembly and component levels. The report generated at the production report generating station 208 (i.e., the production report) typically focuses on subject matter related to the efficiency of the manufacturing process at the manufacturing plant.

In some embodiments, the production report generating station 208 may download report generating software from the report generating software server 218, for example, at the beginning of a production shift, at the end of a day (e.g., at midnight or some other time period when the manufacturing plant is idle), or as updates to such software become available.

In some embodiments, parts or all of the report generating software are disposed in the production report generating station 208. For example, the production report generating station 208 may comprise a PC or other computerized system coupled to memory, such as a hard disk, flash memory, ROM, a floppy disk, a magnetic tape, an optical disk, a CD-ROM, or the like. In such embodiments, parts or all of the software stored in the report generating software server 218 may be installed on the production report generating station 408. Software updates may need to be physically transferred to the manufacturing plant for installation, for example, by sending such updates on a CD-ROM via mail to the manufacturing plant. In some embodiments, the report generating software server 218 may be disposed within server 202, and communications link 238 may then be omitted.

The development engineering portion of the manufacturing system may include a central production station 212, a central report generating station 214, and a test specification/software station 216, each operatively coupled with the central switch 210 via a communications link 230. One or more of these stations 212, 214, and 216 may correspond to the central station 116 illustrated in FIG. 1.

The central production station 212 may be configured to perform a central production function comprising one or more station production functions performed on the production station 206. The central production station 212 may also be adapted to perform other central production functions. Such functions may include managing production station activities, where such managing includes monitoring activity on the production station 206, recording such activity for replication as well as analyzing, troubleshooting, and taking over control of activity on the production station 206. For example, rather than troubleshoot at the company headquarters using information related to a problem encountered at the manufacturing plant obtained from an in-person visit, emails, telephone conversations, exchange of photos or other descriptions, a user of the central production station 212 may emulate or take control over the troubleshooting as if the user were located at the manufacturing plant. This may help save time and decrease the likelihood of noncommunication and omission of information that may be critical to development engineers to resolve the problem. The ability to troubleshoot remotely is particularly advantageous in the manufacture of products incorporating technology in skilled areas, such as microwave radios, when the manufacturing plant may not have personnel with a skill set in the particular technology.

The central production station 212 is further adapted to perform central production functions including managing testing of production software, instructions, and specifications. This includes testing, prior to release, new revisions, updates to and upgrades of software, specifications, and instructions. Pre-release testing may include testing of beta versions of software. Updates may include bug fixes. Upgrades may include additional or modified functionality. Upon release, the central production station 212 may cause such new revisions, updates, and upgrades to be stored in the server 202. The central production station 212 may thereafter cause them to be downloaded and installed on the production station 206. Alternatively, the central production station 212 may thereafter make such new revisions, updates, and upgrades accessible to the production station 206 for download and installation. The production station 206 may then initiate such download and installation.

The test specification/software station 216 is adapted for development and testing of software, specifications, and instructions. The station 216 may comprise a PC or other computerized system adapted to the development of software. It may include, for example, software development software tools including a compiler, libraries, version control, configuration software, etc. Upon completion of a new revision, such revision may be made available to the central production station 212 for testing prior to release thereof for use on the production station 206. Testing on the central production station 212 may include, for example, testing from a production perspective by an engineer with production experience, experience the development engineer using the test specification/software station 216 may not have. In some embodiments, the test specification/software station 216, or portions thereof, may be installed on the same PC or computerized system as the central production station 212.

Development of software may include designing, coding, debugging, building a software executable and so forth. Such software may be developed to perform one or more station production functions and/or central production functions, as described elsewhere herein. Testing of such software may include testing from a functional and performance perspective. Examples of such testing include testing that the developed software performs the functions as designed, that the program has sufficient memory to run, that the program installs properly, and the like. Testing may further include testing from a production perspective. Examples of such testing may include emulating an installation process of the software on a production station at the manufacturing plant, the processing of an actual unit in accordance with instructions for use at the particular production station in the manufacturing plant, and so forth. In some embodiments, testing from a manufacturing perspective may be carried out at the central production station 212 rather than, or in addition to, on the test specification/software station 216.

Development of instructions may include writing a document that includes a description of how to perform one or more tasks on the particular production station. Such description may include text, drawings, flow charts, photos, and the like. Development of instructions may further include translating such documents to one or more different languages. Likewise, development of specifications may include writing a document that includes a description of revisions, configurations, branding, and the like associated with a particular product or product top level part number. Development of specifications may also include specifications for how to configure a production station. For example, such specifications may include a list, table, or other description of what software to install on the production station in order to cause the production station to perform one or more station production, functions, what instructions and specifications to use at the production station when thus configured, and so forth. Testing of instructions and specifications may include peer review of the descriptions, for example, by an engineer at the company having experience in manufacturing operations, and by an individual who is a native speaker of the language to which, such instructions and specifications have been translated.

The central report generating station 214 is operatively coupled with the report generating software server 218 and adapted substantially as described in connection with the production report generating station 208. In some embodiments, all or part of the report generating software may be installed on the central report generating station 214. For example, the central report generating station 214 may have access to data stored in the server 202 not accessible to the production report generating station 208. Examples may include restricted access read-only data or restricted access read-and-write data as is described in further detail in connection with FIG. 5. The report generating software server 218 may include software features or functionality that gives management, financial controllers, and others access to data not accessible to production personnel operating the production report generating station 208. Examples of such data may include financial data such as costs, pricing, discounts, and commissions. Thus, the report generated at the central report generating station 214 (i.e., the central report) may include subject matter different from, or in addition, to the subject matter included in tire production report generated at the production report generating station 208. Thus, the central report may, like the production report, include subject matter related to the efficiency of the manufacturing process at the manufacturing plant as well as, unlike the production report, subject matter related to, for example, a trend in the cost of manufacturing the product, profit margin or other measures including data related to sales of products as well as their manufacture, and so forth. In some embodiments, portions of the report generating software server 218 may, additionally or alternatively, be installed on the central report generating station 214.

The production report generating station 208, the central production station 212, the test specification/software station 216, and the central report generating station 214 may each, like the production station 110, be partially or fully manual, automated or automatic. In embodiments in which the stations 208, 212, 214, 216 perform at least part of their respective functions automatically or in an automated fashion, the stations 208, 212, 214, 216 may be a PC or other computerized system. Such computerized system may include hardware, memory, and software substantially as described in connection with the production station 110. Likewise, in embodiments in which the stations 208, 212, 214, and 216 perform their respective functions manually, or partly manually, they may comprise elements substantially as described in connection with the production station 110.

The central production station 212 may further include one or more of test probes, a reader, a scanner, a voltmeter, and so forth, in any combination, substantially as described in connection with the production station 110.

The communications links 230, 232, 234, 236, and 238 are substantially similar to communications links 112 and 114 described earlier. In some embodiments, communications link 238 is optional. An example includes an embodiment in which report generating software is installed on one or more of the report generating stations 208 and 214. In some embodiments, the production switch 204 may be optional. An example includes an embodiment in which the server 202 is operatively coupled with the production station 206 and with the production report generating station 208 via a direct communications link. Likewise, in some embodiments, the central switch 210 may be optional. An example includes an embodiment in which the server 202 is operatively coupled with the central production station 212, with the central report generating station 214, and with the test specification/software station 216 via a direct communications link.

As noted earlier, the configuration of the production station 206 may depend on the software, specifications, and instructions installed on the particular production station 206. The production station 206 may be configured as, for example, an incoming inspection station, a final QA station, an OEM (original equipment manufacturer) branding station, a test station, a thermal station, a calibration station, an assembly station, or a combination thereof. Likewise, the central production station 212 may be configured to perform the functions of a central assembly station or a central variant of another particular configuration of the production station 206 to allow the development engineers to emulate and control that configuration of the production station remotely from the company headquarters.

The manufacturing system illustrated in FIG. 2A may further include a PLM server 220 operatively coupled via communications link 240 with a PC 222 disposed in the production portion. The PLM server 220 is typically separate from the server 202, i.e., not operatively coupled with the server 202. The PLM server 220 may include an ERP server, a CRM server, an SCM server, and the like. Each such server may be operatively coupled with a separate PC 222 at the manufacturing plant. Thus, for example, PLM server 220 may comprise an Oracle ERP server operatively coupled with a first PC 222*a*, an Agile server operatively coupled with a second PC 222*b*, and a LIA (licensing information application) server operatively coupled with a third PC 222*c*. Such PCs 222*a*, 222*b*, and 222*c* (not shown individually) are typically not operatively coupled with each other. The Oracle ERP server may be adapted to store, for example, data associated with production control, scheduling, the driving of material, and an accounting ledger. The Agile server may be adapted to store, for example, part and assembly documentation, such as BOMs. The LIA server may be adapted to track licensing of software. Such tracking may include revisions and configurations of radio software per customer for microwave radio products. Data associated with the tracking of licensing may include license terms and options, which may depend on, for example, number of units manufactured or radio capacity licensed by a customer. The customer may upgrade its licensed radio capacity, for example, from 4×E1 to 8×E1, for one or more of the configurations of manufactured radios it purchases.

The PC 222 is adapted to access, retrieve, and process data from the PLM server 220. Processing may include performing computations using the data. The PC 222 is further adapted to process the data responsive to input, for example, obtained from an operator using an input device operatively coupled to the PC 222 (not shown). The input device may be a keyboard, a key pad, a pointing device such as a mouse, or input stored on memory coupled to the PC 222, such as flash memory, magnetic tape, optical disk, floppy disk, CD-ROM, etc. The PC 222 may be further adapted to restrict access to the data the PC 222 may retrieve to select users. Restriction may be accomplished, for example, by the use of username and password, a VPN, or a physical restriction such as by placing the PC in a room to which only select users have access via a badge reader on an entrance to the room, or the like.

The server 202 may comprise multiple servers. For example, in a distributed manufacturing system, the server 202 may comprise a central server at the company headquarters and one production server at each manufacturing plant (e.g., at each of one or more CMs). Some manufacturing systems may include redundant servers, as is further described in connection with FIG. 4.

The manufacturing system illustrated in FIG. 2A further optionally includes elements adapted to render the system backwards compatible with legacy systems and data. For example, the company may continue to use some elements of a legacy system. Such system may include a system used prior to installation of some or all of the system elements described above, such as the server 202. The legacy data may include data associated with products shipped or serviced prior to a certain date. For example, personnel at a customer support or field services department of the company may wish to access serial number, part number, configuration revisions, service data, ship-to data, and so forth associated with products shipped prior to installation of the server 202. Such personnel may further wish to access corresponding data associated with products shipped thereafter. To that end, the manufacturing system may include a daily/weekly MDA (manufacturing data access) station 224, a staging/MDA server 226, and an MDA station 228. The daily/weekly MDA station 224 is typically disposed in the production portion of the system.

The daily/weekly MDA station 224 is adapted to store or otherwise obtain manufacturing data from the manufacturing process over a period of time, such as a day or a week. The daily/weekly MDA station 224 is further coupled with and adapted to download the stored data to the staging/MDA server 226. Such download may occur, for example, at the expiration of the period of time. In some embodiments, the download may occur manually. An example is a download initiated by a user operating the daily/weekly MDA download station 224. In other embodiments, parts or all of the download may occur automatically. In some embodiments, the download may be initiated at a remote location, for example, at the MDA station 228.

In some embodiments, the data stored to or obtained by the daily/weekly MDA download station 224 comprises a subset of the data stored in the server 202. For example, the subset may include part number, serial number, configuration revision, customer identifier, date of manufacture, and serial number and part number of units, but the subset may exclude more detailed data, such as cost and supplier data associated with the units. A decision as to what data to include in the data available for download may be based on, for example, the type of data relevant to the customer support or field services department.

The daily/weekly MDA download station 224 is operatively coupled with the staging/MDA server 226 via communications link 242. The communications link 242 is typically uni-directional, i.e., adapted to transfer data in one direction only, here from the daily/weekly MDA download station 224 to the staging/MDA server 226.

The staging/MDA server 226 is adapted to store manufacturing data, including parent/child data, for products manufactured prior to as well as after installation of the manufacturing system of FIG. 2A. Parent data typically includes top level product data such as top level part number and top level serial number of the manufactured product. Child data may include serial number and part number of some or all units of the manufactured product. Parent/child data may include parent data, child data, and/or data that associates parent data with corresponding child data.

The MDA station 228 is adapted to obtain data from the staging/MDA server 226 and to generate reports based on the retrieved data. Examples include reports on a per customer basis, per time unit basis (e.g., data from the past week, month, year, etc.), on a per part number or per configuration basis, and the like. The MDA station 228 is operatively coupled with the staging/MDA server 226 via communications link 244, which is typically uni-directional. As denoted herein, a link may be denoted "uni-directional" even if it allows for select data to be transferred in the opposite direction. Such select data may include query data or data to prompt initiation of an event such as a download. In some embodiments, the communications link 244 may include an Internet or world wide web connection allowing for the user of the MDA station 228 to access the data on the staging/MDA server 226 on more than one computing device. For example, the user may wish to access the data from a home PC, from a work PC, or from a field computing device such as a PDA (personal digital assistant) or other handheld device. The station 228 may then be referred to as a web based MDA station 228. In some embodiments, the MDA station 228 is adapted to restrict access to select users, for example, by the use of username and password, a firewall, a VPN, or physical restriction.

In some embodiments, the staging/MDA server 226 comprises more than one server. An example includes a staging server and a separate MDA server operatively coupled with the staging server via a uni-directional link in a direction toward the MDA server (not shown). Staging may include, for example, disk staging such as writing data first to a hard disk and, second or in parallel, to a tape in a background process. By first writing the manufacturing data to the staging server, the data becomes substantially instantly accessible to the MDA server for download and further access by the MDA station.

Figure 2B:
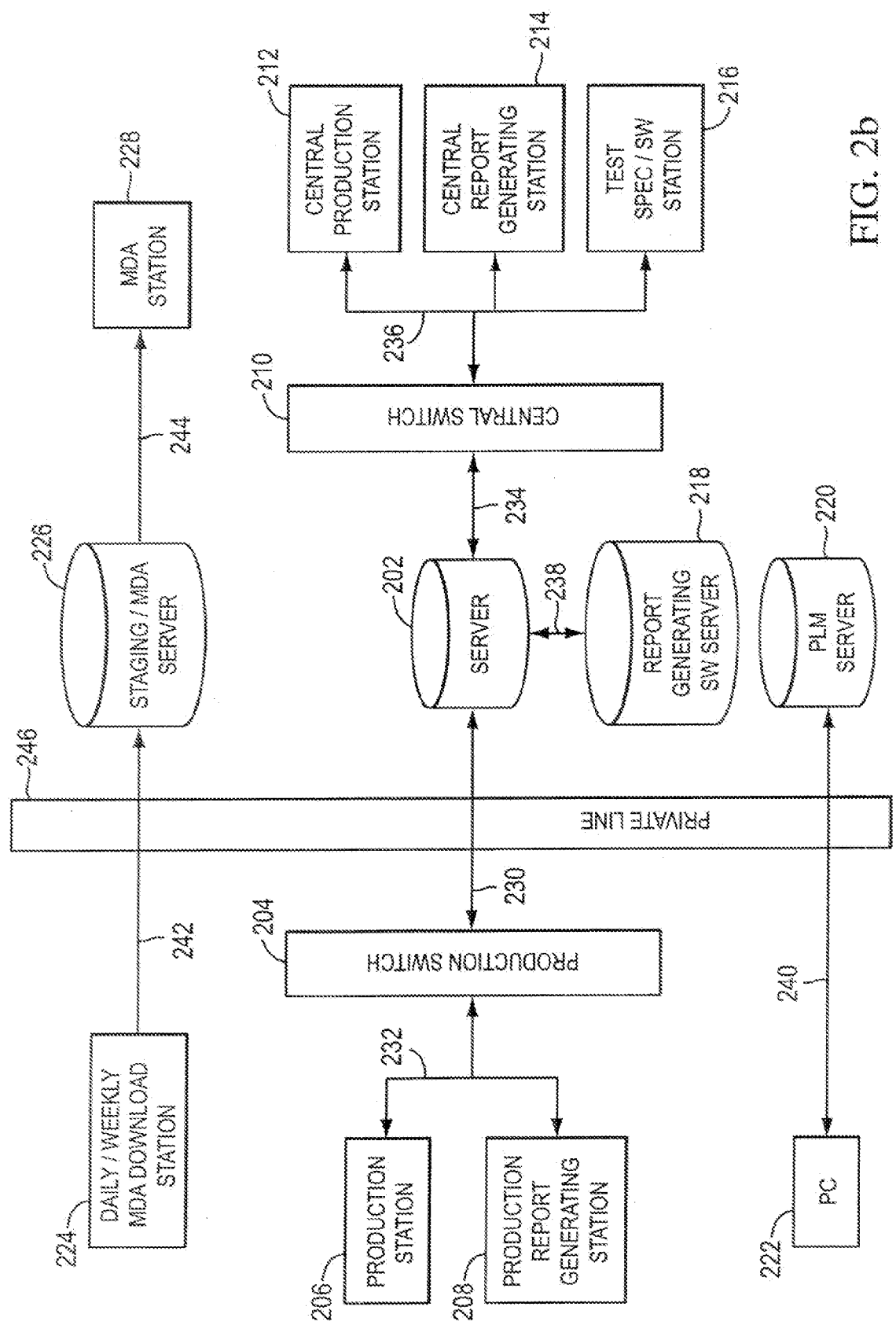
FIG. 2B is a block diagram of a manufacturing system with a remote manufacturing plant according to one embodiment of the invention.

FIG. 2B illustrates a block diagram of a manufacturing system with a remote manufacturing plant according to one embodiment of the invention. The remote manufacturing plant may be owned or operated by the company or by the CM. In addition to the elements described in connection with FIG. 2A, such manufacturing system typically includes a private line 246 adapted to operatively couple the elements of the production portion with the elements of the central and development engineering portions of the system. The private line 246 may be owned or leased by the company or by the CM. The private line 246 is adapted to provide a secure communications link between the CM location and the company location. A secure link may include one that allows for no public access to the data being transferred. In some embodiments, the private line may further be adapted to guarantee a minimum throughput of data to be transferred between the locations. Examples of a private line include a T1 line and a LAN. In the embodiment illustrated by FIG. 2B, the server 202 and the report generating software sever 218 are disposed between the private line 246 and the central switch 210. In such an embodiment, the server 202 and the report generating software server 218 may be operated (e.g., owned, maintained) by the company.

Figure 2C:
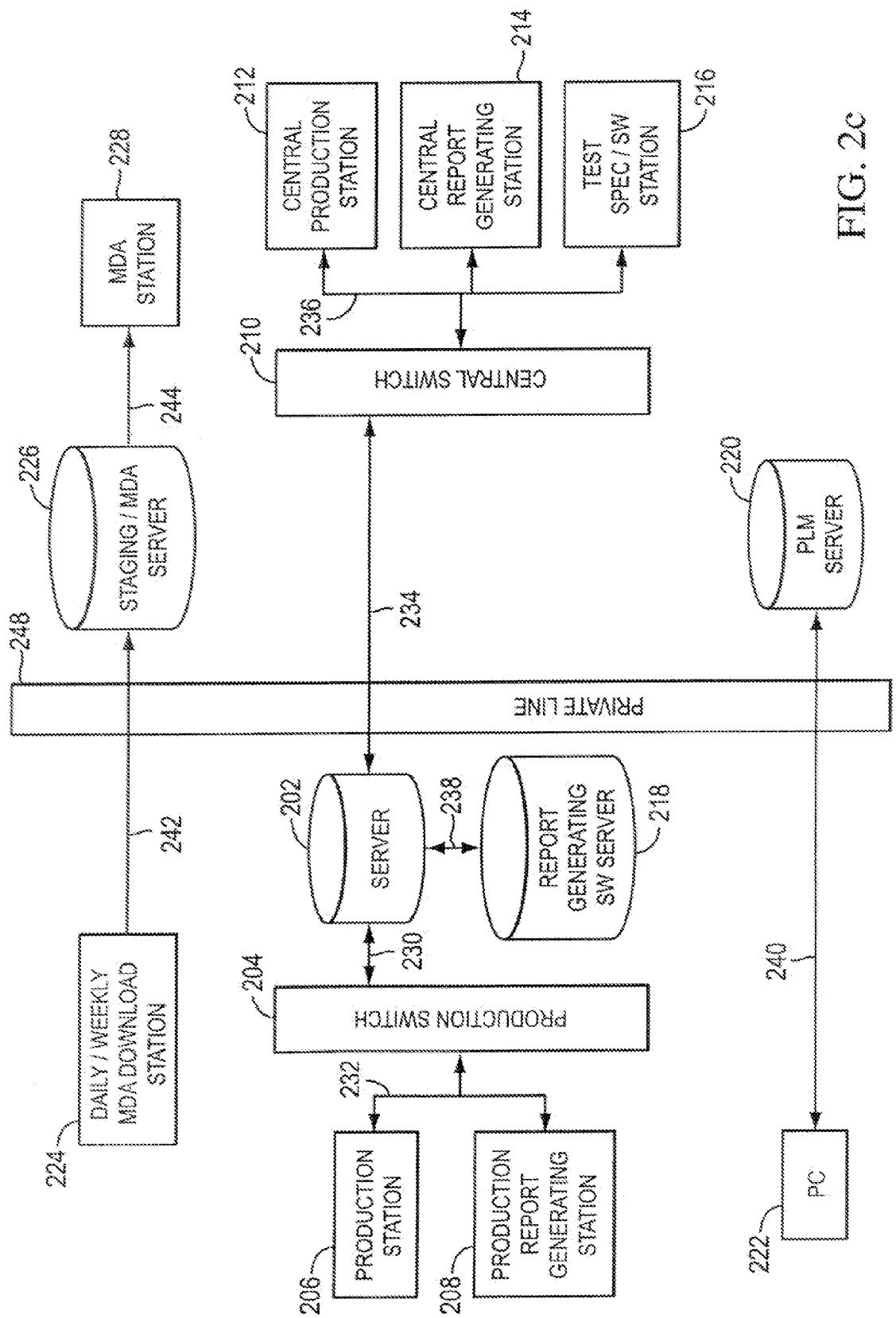
FIG. 2C is a block diagram of a manufacturing system with a remote manufacturing plant according to another embodiment of the invention.

FIG. 2C is a block diagram of a manufacturing system with a remote manufacturing plant according to another embodiment of the invention. FIG. 2C illustrates a variation of the embodiment of FIG. 2B. In FIG. 2C, the server 202 and the report generating software server 218 are disposed between the private line 248 and the production switch 204. For example, the server 202 and the report generating software server 218 may be disposed at the CM or at the company's remote manufacturing plant. In such an embodiment, the server 202 and the report generating software server 218 may be operated by the CM. A person having skill in the art will recognize that a number of other variations of the embodiment of FIG. 2B are feasible. For example, and not shown in FIG. 2C, the PLM server 220 may also be disposed between the private line 248 and the production switch 204. The communications links between, for example, the server 202, the production switch 204, the private line 248, and the central switch 210 may comprise a different embodiment depending on an individual implementation of the manufacturing system.

Some systems include multiple manufacturing plants, for example two CM plants that are not co-located. In such systems, the production portion of the system at the first CM may comprise more elements, or more complex elements, than those at the second CM. For example, the production portion at the second CM may include four production stations configured for testing, one production station configured for assembly, but no PC 222, no production report generating station 208, and no daily/weekly MDA download station 224. The manufacturing system described herein is thus not only portable to multiple manufacturing plants but also capable of being tailored in terms of the number and complexity of elements included in the production portion of the infrastructure. The same scalability applies to the central portion. For example, a first manufacturing system (e.g., set up by a first company) may include all elements illustrated in FIG. 2B, whereas a second manufacturing system (e.g., set up by a second company) may include the server 202, but no report generating software server 218, no PLM server 220, and no staging/MDA server 226. Likewise, the infrastructure of the engineering development portion is flexible and scalable. In a typical implementation, in a manufacturing system that includes two or more production portions, the engineering development portion includes elements corresponding to or required to operate all elements required for both production portions yet without duplication. Thus, referring again to FIG. 1, the central server 106 may store data corresponding to the data stored on CM server 108*a-n*.

Figure 3:
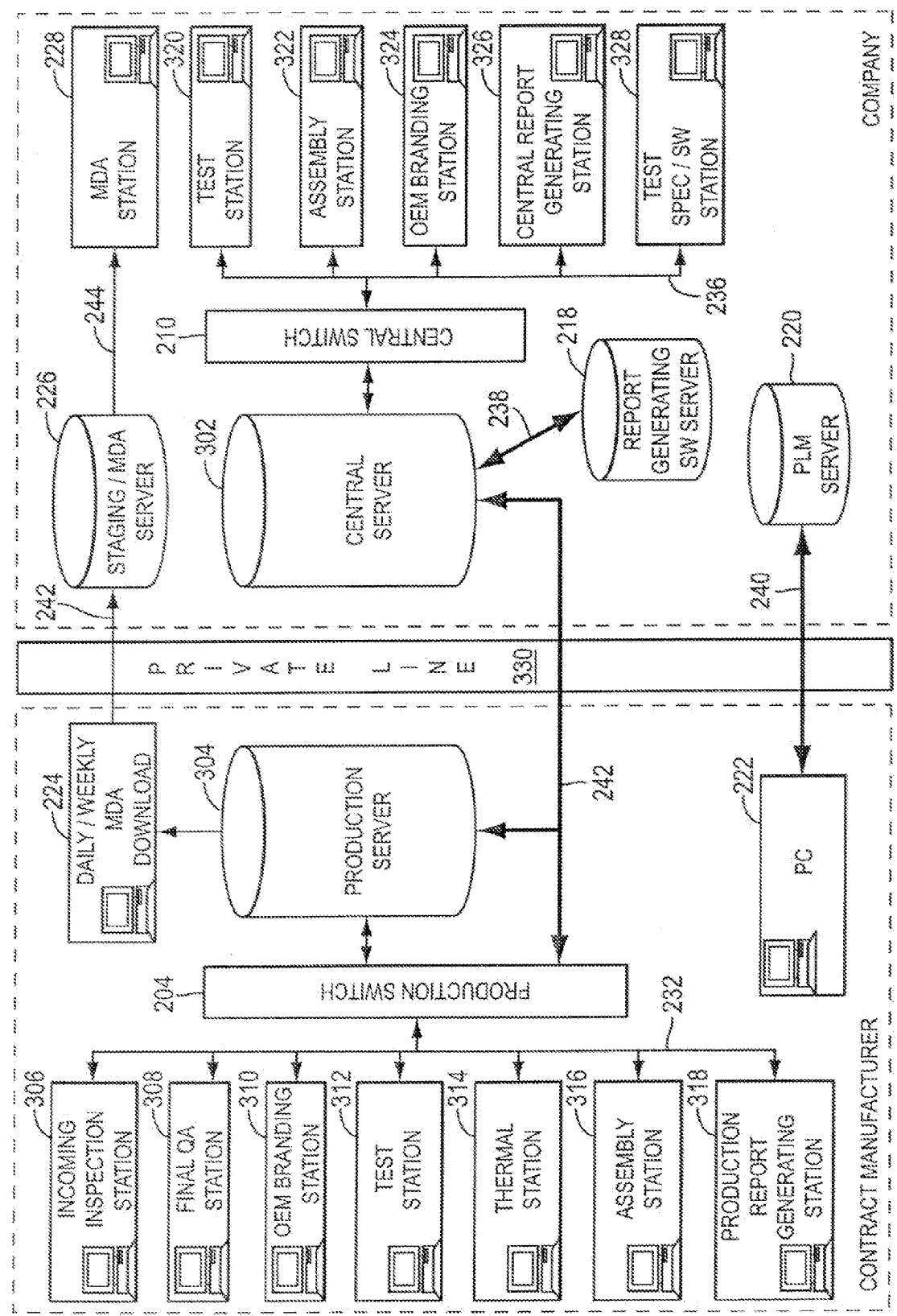
FIG. 3 is a detailed block diagram of a manufacturing system with a remote contract manufacturer's plant according to one embodiment of the invention.

FIG. 3 is a detailed block diagram of a manufacturing system with a remote CM's plant according to one embodiment of the invention. FIG. 3 is essentially an expansion on FIGS. 2B and 2C. In the embodiment illustrated by FIG. 3, the central server 302 described earlier comprises two servers, namely a central server 302 and a production server 304. The production server 304 may, for example, store manufacturing data generated during the manufacturing process performed at the remote CM plant. Such data may thereafter be transferred to the central server 302. Transferring may include copying and moving. Transferring of data stored in the production server 304 may occur, for example, on a scheduled basis such as daily, weekly or based on any other period. The central server 302 may store BOMs, financials, and other data needed for manufacturing at the CM and generated by the company. The central server 302 may comprise two or more servers. An example is one main server and one redundant server (not shown). Another example is a LIA server, an Agile server, an Oracle ERP server as well as, or instead of, a main central server 302.

The remote CM may be located in a country or region in which the spoken language differs from the language used at the company. For example, the company may use English and wish that data be collected and stored in English in the central server 302. The manufacturing system may be adapted to guide operators in a language other than English. For example, guidance, such as data, prompts, and instructions, may be displayed in a local language. To this end, the software, instructions, and specifications may be developed to be easily translatable. That way, data may initially be captured in the local language and may then be translated prior to storing the data in the server. An example includes capturing (e.g., collecting, generating, retrieving, copying, writing) data on a local PC coupled to the production station at the manufacturing plant. Such captured data may then be translated as part of transferring the data from the local PC to the production server 304. Alternatively, data may be captured and stored in the production server 304 in one language and translated as part of being transferred to the central server 302. Thus, an infrastructure that includes multiple CMs may comprise multiple production servers 304, each storing data or portions of data in a language other than English, while the data stored in the central server 302 comprises data in English only.

The central server 302 is typically owned, operated, and maintained by the company. The production server 304 may be owned by the company and operated and maintained by the CM, or it may be owned, operated, and maintained by the company alone or the CM alone.

Various embodiments of the production station 206 (FIGS. 2B-2C) are illustrated in FIG. 3 separately as incoming inspection station 306, final QA station 308, OEM branding station 310, test station 312, thermal station 314, and assembly station 316. Likewise, various embodiments of the central production station 312 are illustrated separately. For example, FIG. 3 includes a central test station 320, a central assembly station 322, and a central OEM branding station 324. The elements of the manufacturing system are adapted and operatively coupled substantially as described in connection with FIGS. 2B and 2C. The central server 302 and the production server 304 may be communicatively coupled via a communications link 242, which may include a link substantially similar to communications links 114, 230 and 234.

Figure 4:
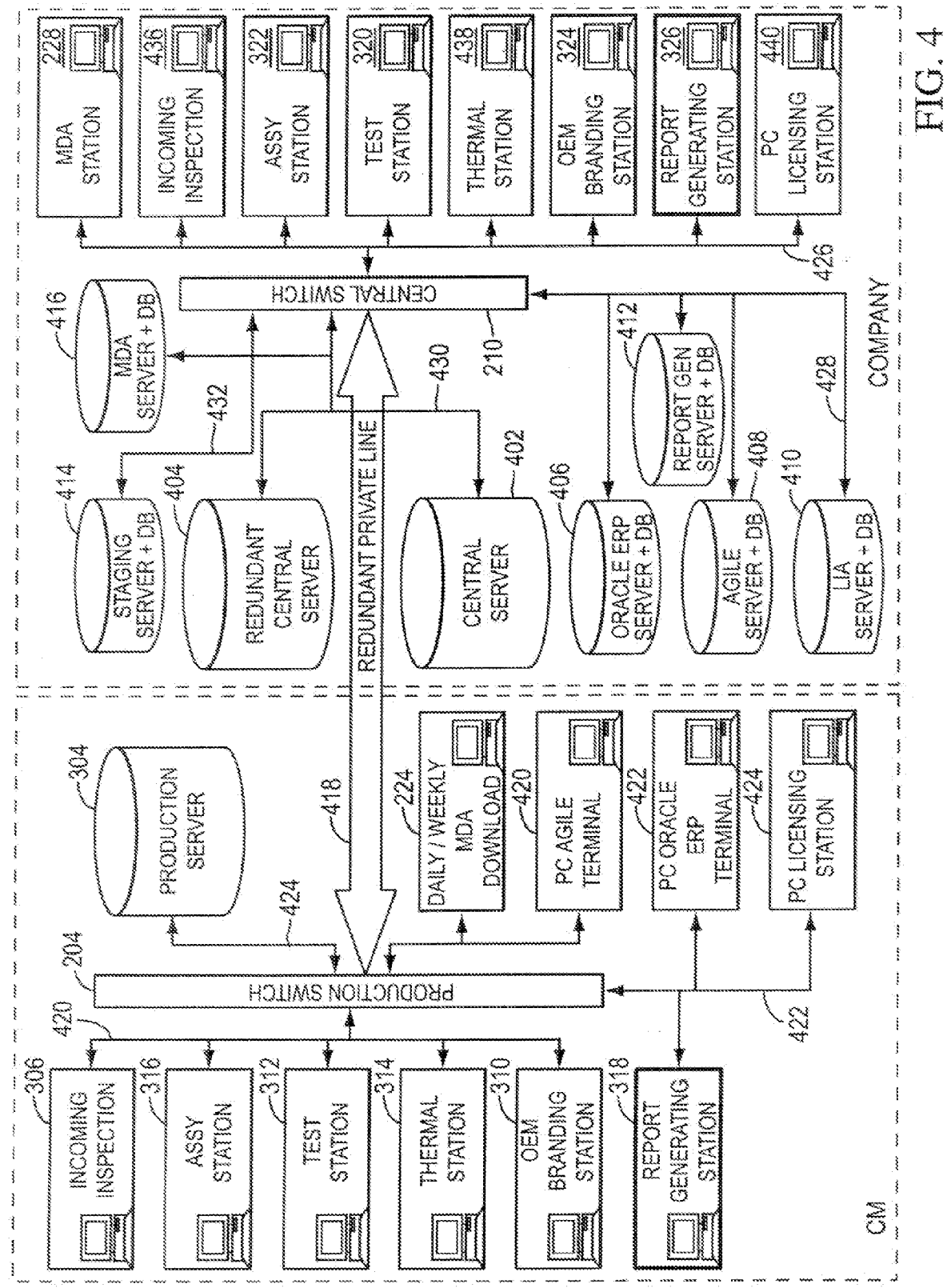
FIG. 4 is a block diagram of a manufacturing system including redundant system elements according to one embodiment of the invention.

FIG. 4 is a block diagram of a manufacturing system including redundant system elements according to one embodiment of the invention. The purpose of redundant elements includes to ensure that the manufacturing system remains operational if the corresponding main (i.e., non-redundant) element fails. The system illustrated in FIG. 4 includes a central server 402 as well as a redundant central server 404, each operatively coupled with the other as well as with the central switch 412. This system further includes a redundant private line 418. The main private line is not shown in FIG. 4. The main private line may include the private line 246, 248, or 330 (FIGS. 2B-2C, 3). The redundant central server 404 and the redundant private line 418 are each adapted to render the system fault tolerant. Thus, the redundant central server 404 is adapted to replace the central server 402 if all or part of the central server 402 fails. Likewise, the redundant private line 418 is adapted to replace the main private line if the main private line fails. These redundant elements guard against loss of data stored in the central server 402 and against loss of data being transferred on the main private line. Various techniques known in the art may be used in implementing and configuring the redundant elements.

In FIG. 4, the PLM server 220 (FIGS. 2A-2C) comprises an Oracle ERP server and database 406, an Agile server and database 408, and a LIA server and database 410, each operatively connected with a dedicated corresponding PC. Thus, PC Oracle ERP terminal 422 may be operatively connected to the Oracle ERP server and database 406. Likewise, the system includes a dedicated PC Agile terminal 420 and a dedicated PC licensing station 424. In the embodiment of FIG. 4, the operative coupling between such servers and their corresponding dedicated PCs may be achieved via a combination of the central switch 210, the redundant private line 418, and the production switch 204 rather than, or in addition to, the more direct operative coupling shown in FIGS. 2A-2C (i.e., communications link 240). The PCs may further be operatively coupled with the report generating station 318. A PC licensing station 440 may be included in the engineering development portion of the system instead of, or in addition to, the PC licensing station 424.

In the embodiment of FIG. 4, the staging/MDA server 226 (FIGS. 2A-2C) may comprise a staging server and database 414 and a separate MDA server and database 416, each operatively coupled with the MDA station 228 via the central switch 210 and communications links 432 and 434. The operative couplings may comprise the redundant operative coupling illustrated in FIG. 4, the main operative coupling as illustrated in FIGS. 2A-2C, or a combination thereof.

Figure 5:
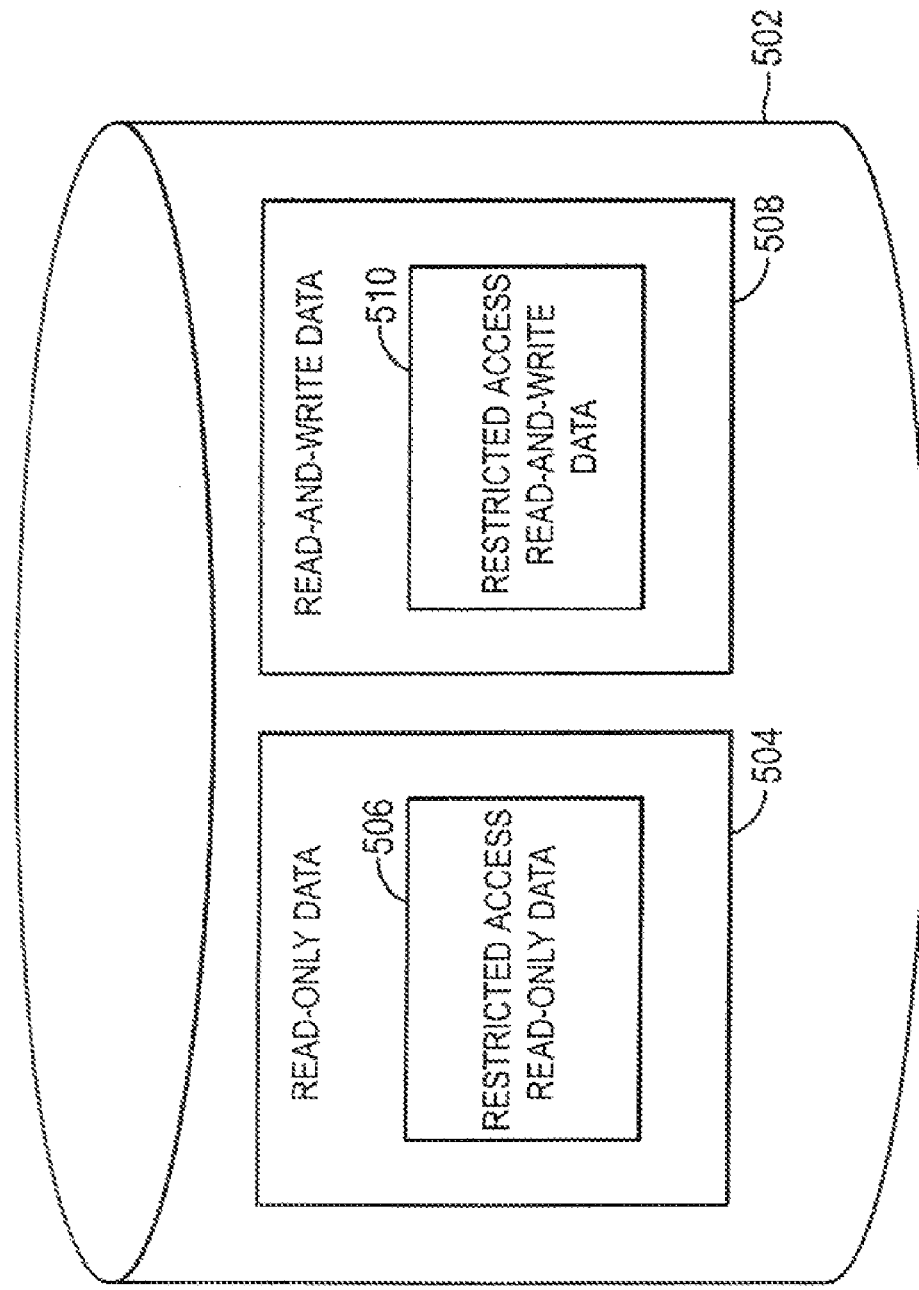
FIG. 5 is a block diagram of a server according to one embodiment of the invention.

FIG. 5 is a block diagram illustrating a server 502 according to one embodiment of the invention. The server 502 is adapted to store data, some portions of which may comprise read-only data 504 and other portions of which may comprise read-and-write data 508. For example, in some embodiments, the production station may be adapted to have access only to read-only data stored in the server 502. Examples of read-only data include supplier part number, company part number, CM part number, serial number, and revision, of a unit such as of a mechanical subassembly whose revision is not capable of being altered during production. In addition, read-only data may include portions of test results for a unit tested at a previous station in the manufacturing process. For example, in some embodiments, a production station configured as an assembly station may be adapted to have access to, but not alter, test results written in the server at the production station preceding the assembly station in the manufacturing process.

Some portions of the read-only data 504 may comprise restricted access read-only data 506. Examples of such data include sales order data, such as price, customer identification data, salesperson identification data (e.g., commission percentage), distributor identification data (e.g., discount and annual commit volumes), and purchase order data. The purchase order data may be designated restricted access read-only data, because the company or the CM may view such data as having competitive value. Examples include supplier price, applicable discount from the supplier, quantities purchased including cumulative quantities, costed BOM data, and other data that include financial amounts or terms.

Additionally or alternatively, some portions of the data stored in the server 502 may comprise read-and-write data 508. Examples of such data include calibration files, revisions of software and configurations, top level part number, top level serial number, OEM branding (also known as private labeling) data, and shipping record data. In some embodiments, portions of the read-and-write data 508 may comprise restricted access read-and-write data 510. Examples include defect rates, causes of defects, and as-yet unreleased software revisions being developed and tested at the company headquarters. Access to such data may be restricted to management, financial controllers, design engineers, etc. The access may be restricted because of the potential contractual consequences of the data (e.g., data that affects product warranties), because the data includes trade secrets or sensitive information associated with a customer, or for other reasons.

In some embodiments, some data in the server 502 is restricted access read-only or restricted access read-and-write to some and read-only or read-and-write to other users or production stations. For example, new revisions of software, specifications, and instructions being developed at the company headquarters may be stored in the server 502 and designated read-and-write data with restricted access to development engineers. Upon release to the manufacturing plant, such new revisions may be designated read-only data in the server 502. In addition, the restricted access designation may be removed or changed to include, for example, some or all users or stations at the manufacturing plant. Access to or retrieval of restricted access data may be implemented on the same station (e.g., on the production station 110 or on a PC used for development at the company headquarters), for example, by the use of username and password.

Figure 6:
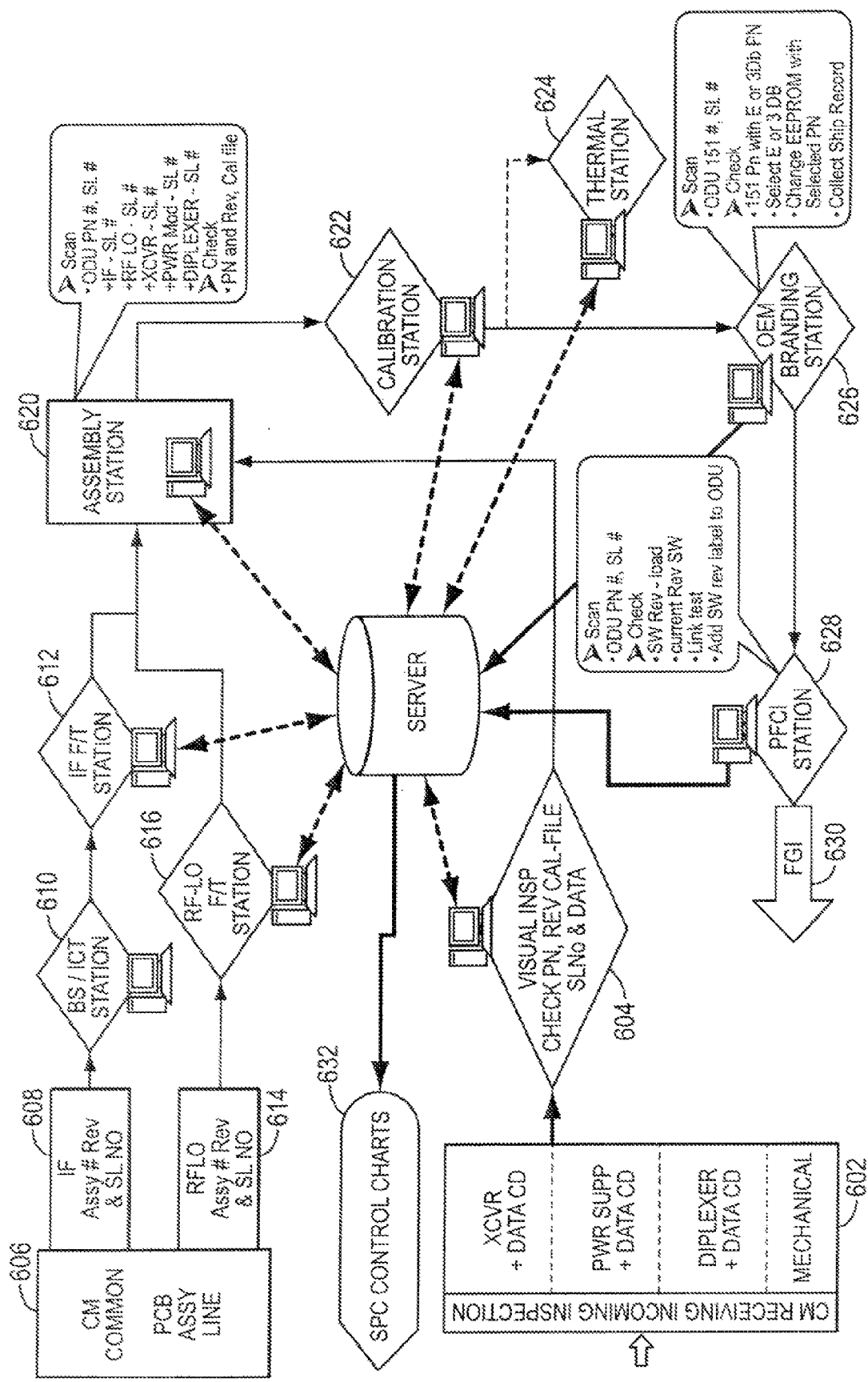
FIG. 6 is a flow diagram of a method for manufacturing products incorporating technology in skilled areas according to one embodiment of the invention.

FIG. 6 is a flow diagram of a method for manufacturing products incorporating technology in skilled areas according to one embodiment of the invention. According to this method, a product may be assembled from units from at least two sources. First, units that incorporate technology in skilled areas may be received at the CM receiving incoming inspection at step 602. Examples of such units include a transceiver (XCVR), a power supply, a diplexer, and a mechanical subassembly. In addition, at step 602, data associated with such units may be received. Such supplier provided data may include part number (e.g., the part number of a supplier, of the CM, of the company, or a combination thereof), serial number, configuration revision, and calibration file. The data is typically received in electronic format, such as on a CD-ROM. Purchasing or otherwise obtaining units incorporating technology in skilled areas from suppliers that specialize in such technology allows for the manufacture of the product at a manufacturing plant lacking personnel with such specialized skill set. Some configuration or calibration is typically performed by such supplier prior to shipping the unit. This allows for the manufacturing process to address reconfigurations or recalibrations in, typically, a less complex manner than those performed by the supplier.

At step 604, a visual inspection may be performed on the units received at step 602. The visual inspection may include verification of part number, configuration revision, calibration file, serial number, and other data. In addition, at step 604, the data received at step 602 may be stored in a server (e.g., in the server 302, 402 or 404, or in the production server 304).

Second, units not incorporating technology in skilled areas may be assembled at the CM common PCB (printed, circuit board) assembly line at step 606. Units not incorporating technology in skilled areas and further not requiring assembly may nonetheless enter the manufacturing system at step 606. For example, a mechanical subassembly may be received in a ready-to-assemble state.

At step 608, units including IF (intermediate frequency) technology may be assembled. Step 608 may further include generating a unit identifier. The unit identifier may include a part number (e.g., a CM specific part number corresponding to the supplier's part number), a serial number, or both. Step 608 may further include generating or verifying a configuration revision of the IF assembly.

At step 610, the IF assembly may undergo BS/ICT (boundary scan testing, in-circuit testing, or both). The BS/ICT testing is typically performed at a component level, meaning that multiple boundary scan tests may be performed on the IF assembly, for example, one test for each or for a select number of critical components included in the IF assembly. At step 612, the IF assembly may undergo IF F/T (functional testing). Test data and test results obtained (e.g., retrieved, generated, updated) during the BS/ICT may be stored in the server, thereby making such data and results accessible to other production stations substantially instantly. Upon completion of step 612, the IF assembly is typically ready for incorporation into the product.

At step 614, units including an RFLO (radio frequency local oscillator) may be assembled. Step 614 may further include generating a unit identifier, and generating or verifying a configuration revision of the generated RFLO assembly. At step 616, the RFLO assembly may undergo RPLO F/T. Test data and test results obtained during RPLO F/T may be stored in the server, again making such data and results accessible to the other production stations. Upon completion of step 616, the RFLO assembly is typically also ready for incorporation into the product.

At step 620, the product may be assembled. Assembly may include incorporating units received at step 602 and step 606, assemblies from steps 608 and 614, or a combination thereof.

A user may retrieve or otherwise input top level product data for the product to be assembled. The user is typically an operator of a production station configured as an assembly station. Retrieval may include using a scanner or bar code reader. Other input may include entering data via a keyboard, a key pad, or a pointing device such as a mouse. The top level product data typically includes top level part number and top level serial number. The user may further retrieve data associated with the individual unit. Such data may include serial number, part number, configuration revision, and calibration file. The user may also obtain, from the server, data corresponding to the data retrieved from the unit. If the retrieved data and the data obtained from the server match, the unit is typically accepted for incorporation into the product. The process may be repeated for the next unit until all units to be incorporated have been accepted. If, however, the retrieved data does not match or is otherwise incompatible with the data obtained from the server, the assembly at step 620 may be stopped and an error message generated and displayed to the user. The error message may be an error message in text on a display, another visual error message such as a change of color of a light from, say, green to red, or from light off to a blinking light on, or the like.

A manual override at step 620 is typically not possible. Rather, the process may typically resume only after the user takes remedial action. Remedial action may include replacing the unit with a properly configured unit and repeating some or all tasks of the process at step 620. Upon successfully completing the process of verifying all units, step 620 may further comprise updating or generating data associated with the assembled product, and writing the updated or generated data in the server. Such data may include a new or updated calibration file, for example, a calibration file associated with the top level product data of the assembled product.

At step 622, the calibration file associated with the product assembled in step 620 may be tested to determine whether the assembled product meets a calibration specification. Step 622 may be performed on a production station configured as a calibration station. The calibration station may be configured to perform calibration adjustment and calibration testing. The calibration specification may be stored on the calibration station or obtained from the server. Calibration specifications may vary depending on part number, desired configuration, or the like. If the assembled product does not meet the calibration specification, the calibration of the assembled product may be adjusted using software, specifications, and instructions installed on the calibration station. Such software, specifications, and instructions are typically downloaded and installed from the server, where they are typically stored following development and testing by development engineers at the company. By making development engineers, rather than production personnel responsible for developing calibration software, calibration specifications, and calibration instructions, the operator performing step 622 need not have special skills in a skilled area such as microwave technology. Upon completion of successful calibration at step 622, an updated or generated calibration file for the assembled product is typically stored in the server.

At step 624, thermal testing may be performed on all, a select number, or a select percentage of the assembled and calibrated units of product from step 622. In some embodiments, step 624 is optional.

OEM branding may be added at step 626. For example, the company may sell the same part number in three configurations, one that includes no branding, another that includes the company's own branding (e.g., name and logo), and a third that includes a customer's branding. The addition of such OEM branding may include obtaining the top level part number and the top level serial number of the assembled product. Obtaining may include retrieval from the assembled product or obtaining from the server. In some embodiments, a specific "151 part number" may be used for OEM branding purposes. At step 626, in response to the retrieved 151 part number, a selection may be made between multiple branding choices. For example, a first choice may be called "E" branding and a second choice "3DB" branding. In some embodiments, a configuration revision may be stored to memory on a unit incorporated into the product. Such memory may include EEPROM (electrically erasable programmable read only memory). The configuration revision may be updated in response to the chosen branding. In some embodiments, products may arrive at step 626 without branding, and some branding may be added at step 626. In other embodiments, products may arrive at step 626 with a default branding, and the configuration revision stored on the product (or a unit incorporated therein) may be updated only if the branding is to be changed. Step 626 further includes storing new or updated branding data associated with the product in the server. In some embodiments, a shipping record may also be obtained at step 626. Obtaining the shipping record may include obtaining a hardcopy. Alternatively or additionally, the shipping record may be obtained from the server.

At step 628, PFCT (post functional testing) may be performed on the product. The top level part number and top level serial number are typically retrieved and some testing performed on the product. Such testing may include verification. Verification may include obtaining data associated with the top level product data from the server and comparing the obtained data wills corresponding data retrieved from the product. Retrieval may include from a bar code or other label on the outside of the product or from EEPROM. Such comparisons may include verification of the configuration revision, for example, the software revision. If the configuration revision is found to be incorrect, software compatible with a required configuration revision may be downloaded from the server and installed on the unit, after which the updated configuration revision may be stored in the server, and the EEPROM on the product may be updated. A label may also be added to the exterior of the assembled product indicating the final configuration revision. If upon arrival at step 628, the product includes a label, the label may be removed and a new label added. Alternatively, the new label may be added on top of a previous label. The PFCT may further include, in embodiments in which microwave radios are manufactured, performing a link test of the radio product. At step 630, the product may be forwarded to FGI (finished goods inventory).

A unit or fully assembled product may fail a test or other processing at one or more of the steps in the method. Such unit, or the product incorporating the unit, may be returned to the supplier of the unit. An example includes a failure identified at CM receiving incoming inspection in step 602. Alternatively, the unit or product may be discarded. Examples include if the assembled product cannot, at least not economically, be repaired or if a unit cannot be removed and replaced. Another alternative includes forwarding the unit or the product to a production station for an update or upgrade. An example includes if the software or other configuration is incorrect but may be corrected, for example, to conform to customer-specific licensing or branding. Such steps are not shown in FIG. 6.

In some embodiments, one or more steps illustrated in Figure b are optional. For example, in some embodiments, the company may not manufacture products that include private labeling, and thus the OEM branding step 626 may be optional (i.e., omitted). In some embodiments, fully tested and assembled products may be shipped without first being sent to FGI, and thus step 630 may be optional or replaced with a step comprising forwarding the product to a next step in the manufacturing process (other than FGI), such as to a pack-out station.

In sum, the present invention contemplates various design approaches to address manufacturing of products incorporating technology in skilled areas. Preferably, these include storing data in a server to make such data substantially instantly accessible to various stations used in the manufacturing process. Stations may include production stations as well as, for example, report generating stations. Although the present invention has been described in considerable detail with reference to certain preferred embodiments thereof, other embodiments are possible. Therefore, the spirit and scope of the appended claims should not be limited to the description of the preferred embodiments contained herein.

We claim:

1. A manufacturing system, comprising:
   a server system located at a first location, the server system configured to store manufacturing data regarding manufacture of a type of product;
   a first production station communicatively coupled with the server system, the first production station located at a second location different from the first location and configured to manufacture a first unit of the type of product based on the manufacturing data;
   a second production station communicatively coupled with the server system, the second production station located at a third location that is different from the first location and the second location, the second production station configured to manufacture a second unit of the type of product based on the manufacturing data;
   a central production station communicatively coupled with the server system, the central production station located remotely from the first production station and the second production station, the central production station configured to provide the server system the manufacturing data and perform a central production function,
   wherein the manufacturing data once written in the server system is substantially instantly accessible to the first and second production stations;
   a report generating software server communicatively coupled with the server system and configured to store report generating software; and
   wherein the first production station further comprises a production report generating station communicatively coupled, via the server system, with the report generating software server and configured to execute the stored report generating software, to obtain the manufacturing data from the server system, and to generate a production report;
   wherein the central production station further comprises a central report generating station communicatively coupled, via the server system, with the report generating software server and configured to execute the stored report generating software, to obtain the manufacturing data from the server system, and to generate a central report;
   wherein the central report includes one or more of sales data, customer data, pricing data, sales commission data, costed bill of materials data, and restricted access data including restricted access read-only data, restricted access read-and-write data, or both, accessible to company management personnel but not to personnel at the first production station.

2. The manufacturing system as in claim 1, wherein the first production station is adapted to be operated by a person who is unskilled in the area of technology.

3. The manufacturing system as in claim 1, wherein the first unit is a manufactured product, a partially manufactured product, or a product to be manufactured.

4. The manufacturing system as in claim 1, further comprising a production switch operative to communicatively couple the server system with the first production station.

5. The manufacturing system as in claim 1, further comprising a central switch operative to communicatively couple the server system with the central production station.

6. The manufacturing system as in claim 1, wherein the first production station is further configured to perform a station production function, the station production function including managing testing of production software, instructions, and specifications, or any combination thereof.

7. The manufacturing system as in claim 1, wherein the first production station is further configured to perform a station production function including one or more of incoming inspection, assembly, testing, branding, final quality assurance, and calibration.

8. The manufacturing system as in claim 7, wherein the testing includes one or more of boundary scan testing, in-circuit testing, intermediate frequency functional testing, radio frequency local oscillator functional testing, thermal testing, and post functional testing.

9. The manufacturing system as in claim 7, wherein the station production function is performed manually, automatically, in an automated fashion, or in any combination thereof.

10. The manufacturing system as in claim 1, wherein the central production station further comprises a test specification/software station which is communicatively coupled with the server system and is operative for development of software, specifications, and instructions adapted to configure the first production station for performing the station production function.

11. The manufacturing system as in claim 10, wherein the central production station is further communicatively coupled to the test specification/software station and operative to test the software, specifications, and instructions developed on the test specification/software station and to write the developed and tested software, specifications, and instructions in the server system, the software, specifications, and instructions being substantially instantly accessible to the first production station and central production station once written in the server system.

12. The manufacturing system as in claim 11, wherein one or more of the test specification/software station and the central production station is further configured to remotely cause the software, specifications, and instructions to be downloaded to the first production station.

13. The manufacturing system as in claim 11, wherein the first production station is further configured to initiate download to the first production station of the software, specifications, and instructions.

14. The manufacturing system as in claim 1, wherein the server system includes a production lifecycle management server.

15. The manufacturing system as in claim 1, wherein the server system includes a main server and a redundant server, the redundant server being communicatively coupled with the main server, the redundant server configured to replace the main server in the event that the main server fails.

16. The manufacturing system as in claim 1, wherein the server system is disposed at a manufacturing plant.

17. The manufacturing system as in claim 1, wherein the server system is disposed at a company location.

18. The manufacturing system as in claim 17, wherein company management personnel, including financial controllers, can access the server system locally to obtain manufacturing data stored in the server system and to write manufacturing data in the server system.

19. The manufacturing system as in claim 1, wherein the first production station is further configured to perform a station production function for processing the first unit based on the manufacturing data and wherein processing the first unit includes retrieving data from the first unit, generating new or updated data associated with the first unit, or a combination thereof, and wherein the manufacturing data includes such retrieved and generated data.

20. The manufacturing system as in claim 19, wherein processing the first unit further includes writing the retrieved data, the generated data, or both, in the server system.

21. The manufacturing system as in claim 20, wherein the server system comprises a main server and a contract manufacturer (CM) server, the CM server being communicatively coupled with the main server and wherein a CM portion of the retrieved and generated data is written in the CM server and a company portion of the retrieved and generated data is written in the main server, the CM portion including data associated with the type of product, suppliers of units of the type of product, CM accounting and ledger data, and CM personnel data, the company portion including manufacturing data, sales data, customer data, pricing data, sales commission data, costed bill of materials data, company accounting and ledger data, and company personnel data.

22. The manufacturing system as in claim 21, wherein the CM portion includes all or part of the company portion.

23. The manufacturing system as in claim 21, wherein the company portion includes all or part of the CM portion.

24. The manufacturing system as in claim 1, further comprising a production life-cycle management (PLM) server operative to store PLM data, wherein the first production station further comprises a personal computer (PC) communicatively coupled with the PLM server and operative to obtain the stored PLM data and to process such PLM data, and wherein the manufacturing data includes a portion of the PLM data.

25. The manufacturing system as in claim 24, wherein the PLM server comprises one or more of an enterprise resource planning (ERP) server, an Agile server, and a licensing information access (LIA) server.

26. The manufacturing system as in claim 25, wherein the PC comprises one or more of a PC Agile terminal communicatively coupled with the Agile server, a PC ERP terminal communicatively coupled with the ERP server, and a PC licensing station communicatively coupled with the LIA server.

27. The manufacturing system as in claim 1, wherein the stored manufacturing data includes read-only data portions of which comprise restricted access read-only data.

28. The manufacturing system as in claim 1, wherein the stored manufacturing data includes read-and-write data portions of which comprise restricted access read-and-write-data.

29. The manufacturing system as in claim 1, wherein a unit of the type of product comprises an intermediate frequency subassembly, a radio frequency local oscillator subassembly, a transceiver subassembly, a power module subassembly, a diplexer subassembly, or a mechanical subassembly.

30. The manufacturing system as in claim 1, wherein the type of product comprises an outdoor unit of a split-mount microwave radio system.

31. The manufacturing system as in claim 1, further comprising a staging manufacturing data access (MDA) server operative to obtain, store, and provide the manufacturing data, wherein the first production station further comprises a daily/weekly MDA download station communicatively coupled with the staging/MDA server and configured to provide the manufacturing data to be obtained by the staging/MDA server, and wherein the central production station further comprises an MDA station communicatively coupled with the staging/MDA server and configured to obtain the manufacturing data provided by the staging/MDA server.

32. The manufacturing system as in claim 31, wherein the staging/MDA server comprises a staging server communicatively coupled with an MDA server, the staging server being operative to stage the manufacturing data obtained from the daily/weekly MDA download station and to provide such data to the MDA server, the MDA server being configured to obtain the manufacturing data from the staging server and to provide such data to the MDA station.

33. The manufacturing system as in claim 1, further comprising a private line communicatively coupled with the server system and also with the first production station, with the central production station, or with both, and configured to provide a secure communications link between the first production station and the central production station.

34. The manufacturing system as in claim 33, wherein the private line includes a main private line and a redundant private line communicatively coupled with the main private line and operative to replace the main private line in the event that the main private line fails.

35. The manufacturing system as in claim 1, wherein at least one of the communicative couplings with the server system includes a local area network, a wide area network, an optical fiber, a microwave link, Ethernet, Internet, Wi-Fi, a private line, or a leased line.

36. The manufacturing system as in claim 1, wherein the first production station, the central production station, or both, comprises one or more of a personal computer (PC), a computerized system, a device or mechanism to hold manufacturing data obtained together with the first unit, and a device for adding or modifying manufacturing data.

37. A manufacturing system, comprising:
a server system located at a first location, the server system configured to store manufacturing data regarding manufacture of a type of product;
a first production station communicatively coupled with the server system, the first production station located at a second location different from the first location and configured to manufacture a first unit of the type of product based on the manufacturing data;
a second production station communicatively coupled with the server system, the second production station located at a third location that is different from the first location and the second location, the second production station configured to manufacture a second unit of the type of product based on the manufacturing data;
a central production station communicatively coupled with the server system, the central production station located remotely from the first production station and the second production station, the central production station configured to provide the server system the manufacturing data and perform a central production function;

wherein the manufacturing data once written in the server system is substantially instantly accessible to the first and second production stations; and a production life-cycle management (PLM) server operative to store PLM data, wherein the first production station further comprises a personal computer (PC) communicatively coupled with the PLM server and operative to obtain the stored PLM data and to process such PLM data, and wherein the manufacturing data includes a portion of the PLM data;

wherein the PLM server comprises one or more of an enterprise resource planning (ERP) server, an Agile server, and a licensing information access (LIA) server;

wherein the PC comprises one or more of a PC Agile terminal communicatively coupled with the Agile server, a PC ERP terminal communicatively coupled with the ERP server, and a PC licensing station communicatively coupled with the LIA server.

38. A manufacturing system, comprising:

a server system located at a first location, the server system configured to store manufacturing data regarding manufacture of a type of product;

a first production station communicatively coupled with the server system, the first production station located at a second location different from the first location and configured to manufacture a first unit of the type of product based on the manufacturing data;

a second production station communicatively coupled with the server system, the second production station located at a third location that is different from the first location and the second location, the second production station configured to manufacture a second unit of the type of product based on the manufacturing data;

a central production station communicatively coupled with the server system, the central production station located remotely from the first production station and the second production station, the central production station configured to provide the server system the manufacturing data and perform a central production function, wherein the manufacturing data once written in the server system is substantially instantly accessible to the first and second production stations; and a report generating software server communicatively coupled with the server system and configured to store report generating software;

wherein the central production station further comprises a central report generating station communicatively coupled, via the server system, with the report generating software server and configured to execute the stored report generating software, to obtain the manufacturing data from the server system, and to generate, a central report;

wherein the central report includes one or more of sales data, customer data, pricing data, sales commission data, costed bill of materials data, and restricted access data, including restricted access read-only data, restricted access read-and-write data, or both, accessible to company management personnel but not to personnel at the first production station.

39. A manufacturing system, comprising:

a server system located at a first location, the server system configured to store manufacturing data regarding manufacture of a type of product;

a first production station communicatively coupled with the server system, the first production station located at a second location different from the first location and configured to manufacture a first unit of the type of product based on the manufacturing data;

second production station communicatively coupled with the server system, the second production station located at a third location that is different from the first location and the second location, the second production station configured to manufacture a second unit of the type of product based on the manufacturing data;

a central production station communicatively coupled with the server system, the central production station located remotely from the first production station and the second production station, the central production station configured to provide the server system the manufacturing data and perform a central production function, wherein the manufacturing data once written in the server system is substantially instantly accessible to the first and second production stations; and the server system configured to store report generating software;

wherein the first production station, further comprises a production report generating station communicatively coupled with the server system and configured to execute the stored report generating software, to obtain the manufacturing data from the server system, and to generate a production report;

wherein the central production station further comprises a central report generating station communicatively coupled with the server system and configured to execute the stored report generating software, to obtain the manufacturing data from the server system, and to generate a central report;

wherein the central report includes one or more of sales data, customer data, pricing data, sales commission data, costed bill of materials data, and restricted access data, including restricted access read-only data, restricted access read-and-write data, or both, accessible to company management personnel but not to personnel at the first production station.

40. The manufacturing system as in claim 39, wherein the central production station further comprises a test specification/software station which is communicatively coupled with the server system and is operative for development of software, specifications, and instructions adapted to configure the first production station for performing the station production function.

41. The manufacturing system as in claim 40, wherein the central production station is further communicatively coupled to the test specification/software station and operative to test the software, specifications, and instructions developed on the test specification/software station and to write the developed and tested software, specifications, and instructions in the server system, the software, specifications, and instructions being substantially instantly accessible to the first production station and central production station once written in the server system.

42. The manufacturing system as in claim 41, wherein one or more of the test specification/software station and the central production station is further configured to remotely cause the software, specifications, and instructions to be downloaded to the first production station.

43. The manufacturing system as in claim 41, wherein the first production station is further configured to initiate download to the first production station of the software, specifications, and instructions.

44. The manufacturing system as in claim 39, further comprising a production life-cycle management (PLM) server operative to store PLM data, wherein the first production station further comprises a personal computer (PC) communicatively coupled with the PLM server and operative to obtain the stored PLM data and to process such PLM data, and wherein the manufacturing data includes a portion of the PLM data.

45. The manufacturing system as in claim 44, wherein the PLM server comprises one or more of an enterprise resource planning (ERP) server, an Agile server, and a licensing information access (LIA) server.

46. The manufacturing system as in claim 45, wherein the PC comprises one or more of a PC Agile terminal communicatively coupled with the Agile server, a PC ERP terminal communicatively coupled with the ERP server, and a PC licensing station communicatively coupled with the LIA server.

* * * * *

UNITED STATES PATENT AND TRADEMARK OFFICE
CERTIFICATE OF CORRECTION

| | | |
|---|---|---|
| PATENT NO. | : 8,175,732 B2 | Page 1 of 1 |
| APPLICATION NO. | : 11/615880 | |
| DATED | : May 8, 2012 | |
| INVENTOR(S) | : Tam Dam et al. | |

It is certified that error appears in the above-identified patent and that said Letters Patent is hereby corrected as shown below:

Column 27, lines 61-62, "read-and-write-data" should be changed to --read-and-write data--.

Column 28, line 5, "a staging manufacturing data" should be changed to --a staging/manufacturing data--.

Column 29, line 52, "and to generate, a central report" should be changed to --and to generate a central report--.

Column 30, line 3, "second production station communicatively" should be changed to --a second production station communicatively--.

Signed and Sealed this
Twenty-fourth Day of July, 2012

David J. Kappos
*Director of the United States Patent and Trademark Office*